United States Patent
Shinbata

(10) Patent No.: US 7,024,036 B2
(45) Date of Patent: Apr. 4, 2006

(54) IMAGE PROCESSING APPARATUS, IMAGE PROCESSING METHOD, STORAGE MEDIUM, AND PROGRAM

(75) Inventor: Hiroyuki Shinbata, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 735 days.

(21) Appl. No.: 10/106,101

(22) Filed: Mar. 27, 2002

(65) Prior Publication Data

US 2002/0168109 A1 Nov. 14, 2002

(30) Foreign Application Priority Data

Apr. 3, 2001 (JP) .............................. 2001-104753

(51) Int. Cl.
*G06K 9/00* (2006.01)

(52) U.S. Cl. .................. 382/168; 382/270; 382/274; 348/254; 358/521; 375/240.19

(58) Field of Classification Search ................ 382/168, 382/169, 248, 251, 252, 270–274; 345/600, 345/605; 348/254, 674, 678; 358/518–522; 375/240.19

See application file for complete search history.

(56) References Cited

U.S. PATENT DOCUMENTS

| | | | | |
|---|---|---|---|---|
| 5,447,153 A | * | 9/1995 | Weil et al. ................. | 600/300 |
| 5,454,044 A | | 9/1995 | Nakajima ................... | 382/132 |
| 5,550,647 A | * | 8/1996 | Koike ........................ | 358/3.03 |
| 5,604,824 A | * | 2/1997 | Chui et al. .................. | 382/248 |
| 5,946,407 A | * | 8/1999 | Bamberger et al. ......... | 382/132 |
| 6,031,543 A | * | 2/2000 | Miyashita et al. .......... | 345/593 |
| 6,064,396 A | * | 5/2000 | Ouchi et al. ............... | 345/604 |
| 6,127,669 A | * | 10/2000 | Sidiropoulos et al. ... | 250/208.1 |
| 6,147,771 A | * | 11/2000 | Washio ....................... | 358/1.9 |
| 6,343,158 B1 | * | 1/2002 | Shiohara ..................... | 382/261 |
| 2001/0019335 A1 | * | 9/2001 | Takeo ......................... | 345/670 |

FOREIGN PATENT DOCUMENTS

| | | | | |
|---|---|---|---|---|
| JP | 2509503 | | | 4/1996 |
| JP | 2663189 | | | 6/1997 |
| JP | 11032221 A | * | | 2/1999 |
| JP | 2000-101841 | | | 4/2000 |
| JP | 2000-276590 | | | 10/2000 |

* cited by examiner

*Primary Examiner*—Bhavesh M. Mehta
*Assistant Examiner*—Yubin Hung
(74) *Attorney, Agent, or Firm*—Fitzpatrick, Cella, Harper & Scinto

(57) ABSTRACT

An image processing apparatus substantially performs image processing on an image including first gray-scale conversion processing using a first gray-scale conversion curve. Then, the image processing apparatus performs second gray-scale conversion processing on the processed image using a second gray-scale conversion curve, and displays a composite gray-scale conversion curve combining the first and second gray-scale conversion curves.

19 Claims, 22 Drawing Sheets

IMAGE PROCESSING APPARATUS, IMAGE PROCESSING METHOD, STORAGE MEDIUM, AND PROGRAM

BACKGROUND OF THE INVENTION

1. Field of the Invention

The present invention relates to image processing apparatuses, image processing methods, storage media, and programs for performing gray-scale conversion of images, and more particularly, it relates to an image processing apparatus, an image processing method, a storage medium, and a program for compositely changing the dynamic range of an image and converting the gray-scale of the image or for easily converting the shape of a gray-scale conversion curve.

2. Description of the Related Art

Due to recent advances in digital technology, radiographic images may now be converted into digital image signals (hereinafter the value of a pixel forming the digital image signal is referred to as a pixel value). These digital image signals are subjected to image processing, and the processed digital image signals are displayed on cathode-ray tube (CRT) displays or output onto film. When a radiographic image is captured, a digital image signal obtained by converting the radiographic image is generally subjected to gray-scale conversion in order to make the digital image signal suitable for display on a CRT display or to be output onto film. Also, the digital image signal may be subjected to dynamic range compression in order to make the digital image signal suitable on a CRT display or to be output onto film.

Several conventional methods are used to perform such dynamic range compression. One method is described in SPIE Vol. 626, Medicine XIV/PACSIV (1986). The method is expressed by equation (1):

$$SD = A[Sorg - SUS] + B[SUS] + C \tag{1}$$

where SD is a pixel value after processing. Sorg is an original pixel value (input pixel value). SUS is a pixel value of a low-frequency image of an original image (input image), and A, B, and C are constants (for example, A=3, and B=0.7). In this method, different weights can be assigned to a high frequency component (first term) and a low frequency component (second term). For example, when A=3 and B=0.7, the high frequency component is enhanced, and the overall dynamic range is compressed. It has been determined that an image processed by this method is advantageous over an unprocessed image when conducting diagnosis.

In Japanese Patent No. 2509503, another method expressed by equation (2):

$$SD = Sorg + F(G(Px, Py)) \tag{2}$$

is described, where SD is a pixel value after processing, Sorg is an original pixel value (input pixel value), and Px and Py are average profiles of a plurality of X-direction and Y-direction profiles, respectively, of an original image (input image).

The characteristics of the function F(x) will now be described. When X>Dth, then F(x)=0. When $0 \leq x \leq Dth$, then F(x) monotonically decreases from an intercept E with a slope E/Dth. This can be expressed by equation (3):

$$F(x) = E - (E/Dth)x \tag{3}$$

$$Py = (\Sigma Pyi)/n \tag{4}$$

$$Px = (\Sigma Pxi)/n \tag{5}$$

where (i=1 to n), and Pyi and Pxi are profiles. For example, G(Px, Py) can be expressed by:

$$G(Px, Py) = \max(Px, Py) \tag{6}$$

With this method, a density range in which the pixel value of a low-frequency image is less than or equal to Dth is compressed.

Another method similar to that described in Japanese Patent No. 2509503 is a method described in Anan et al., Journal of the Japanese Society of Radiological Technology, vol. 45, no. 8, p. 1030 (August 1989). This method can be expressed by equation (7):

$$SD = Sorg + f(SUS) \tag{7}$$

$$SUS = \Sigma Sorg/M^2 \tag{8}$$

where SD is a pixel value after processing, Sorg is an original pixel value (input pixel value), SUS is an average pixel value obtained by computing a moving average of pixels within a mask of size M×M pixels of an original image (input image), and f(X) is a monotonically decreasing function. The method differs from equation (2) in the method of generating a low-frequency image. In equation (2), a low-frequency image is generated from one-dimensional data. In contrast, this method generates a low-frequency image from two-dimensional data. Similarly, with this method, a density range in which the pixel value of a low-frequency image is less than or equal to Dth is compressed.

In Japanese Patent No. 2663189, still another method is described, which is expressed by equation (9):

$$SD = Sorg + f1(SUS) \tag{9}$$

$$SUS = \Sigma Sorg/M^2 \tag{10}$$

where SD is a pixel value after processing, Sorg is an original pixel value (input pixel value), SUS is an average pixel value obtained by computing a moving average of pixels within a mask of size M×M pixels of an original image (input image), and f1(X) is a monotonically increasing function.

The characteristics of the function f1(x) will now be described. When x<Dth, then f1(x)=0. When $Dth \leq x$, then f1(x) monotonically decreases from an intercept E with a slope E/Dth. This can be expressed by:

$$f1(x) = E - (E/Dth)x \tag{11}$$

This method compresses a density greater than or equal to the pixel value Dth of a low-frequency image. The algorithm for this method is effectively the same as that described in Anan et al., Journal of the Japanese Society of Radiological Technology, vol. 45, no. 8, p. 1030 (August 1989).

These dynamic range compression methods are suitable for adjusting the amplitude of a low-frequency image and are thus regarded as methods for performing gray-scale conversion of a low-frequency component.

It is common for an image, after being subjected to dynamic range compression, to be subsequently subjected to gray-scale conversion. In this case, gray-scale conversion is performed in accordance with the following gray-scale conversion equation:

$$Y = F(X) \tag{12}$$

where Y is a pixel value of a gray-scale-converted image and X is a pixel value of an original image. A function F( ) for describing the relationship between the digital image X and the gray-scale-converted image Y is referred to as a gray-scale conversion curve. The function F( ) which describes the gray-scale conversion curve is expressed by the following equation (13):

$$Y = \frac{a}{b + c \times \exp(d \times (X - e))} + f \qquad (13)$$

where a, b, c, d, e, and f are parameters for defining the gray-scale conversion curve. In a known image processing apparatus, the shape (such as the slope) of the gray-scale conversion curve is changed by adjusting these parameters.

In the gray-scale-converted image, there are demands for enhancing the contrast of an image region in a target region or changing the gray-scale so that the overall image of an object can be easily observed on a CRT display or on film. It is thus preferable that the shape (such as the slope) of the gray-scale conversion curve be adjustable in accordance with the type, characteristic, or pixel-value range of an object image.

In a known image processing apparatus, gray-scale conversion and dynamic range compression are regarded as independent processes. This is often problematic for an operator to know how the effect of dynamic range compression is reflected in a gray-scale-converted image. Therefore, it is difficult to adjust the parameters of dynamic range compression while taking into consideration gray-scale conversion.

Further, when an image is subjected to frequency processing using a moving average, artifacts such as overshooting may be generated in edge portions.

Still further, in a known image processing apparatus, the shape of a gray-scale conversion curve can be changed by adjusting a plurality of parameters describing the gray-scale conversion curve. It is thus not easy to generate a target curve. For example, in equation (13), it is necessary to appropriately adjust the parameters a, b, c, d, e, and f, and thus it is not easy to adjust the shape of the gray-scale conversion curve. And, even when the parameters are adjusted, the shape (such as the slope) of the gray-scale conversion curve relative to a specific density or pixel-value range may not be set as desired.

SUMMARY OF THE INVENTION

In order to solve the foregoing problems, it is an object of the present invention to provide an image processing apparatus, an image processing method, a storage medium, and a program for easily setting parameters of a process for changing the dynamic range while taking into consideration the characteristics of gray-scale conversion or a gray-scale-converted image.

It is another object of the present invention to provide an image processing apparatus, an image processing method, a storage medium, and a program for easily converting the shape of a predetermined gray-scale conversion curve or a gray-scale conversion curve described by many parameters.

According to the present invention, the foregoing objects are attained by providing an image processing apparatus including an image processing unit for substantially performing predetermined image processing on an image including first gray-scale conversion processing using a first gray-scale conversion curve; a gray-scale conversion unit for performing second gray-scale conversion processing on an image using a second gray-scale conversion curve; and a first curve-display unit for displaying a composite gray-scale conversion curve combining the first and second gray-scale conversion curves.

According to the present invention, the foregoing objects are also attained by providing an image processing method including an image processing step of substantially performing predetermined image processing on an image including first gray-scale conversion processing using a first gray-scale conversion curve; a gray-scale conversion step of performing second gray-scale conversion processing on an image using a second gray-scale conversion curve; and a display step of displaying a composite gray-scale conversion curve combining the first and second gray-scale conversion curves.

According to the present invention, the foregoing objects are also attained by providing a computer-readable storage medium storing a program for processing an image. The program includes codes for executing an image processing step of substantially performing predetermined image processing on an image including first gray-scale conversion processing using a first gray-scale conversion curve; a gray-scale conversion step of performing second gray-scale conversion processing on an image using a second gray-scale conversion curve; and a display step of displaying a composite gray-scale conversion curve combining the first and second gray-scale conversion curves.

According to the present invention, the foregoing objects are also attained by providing an image processing apparatus including an image processing section that substantially performs predetermined image processing on an image including first gray-scale conversion processing using a first gray-scale conversion curve; a gray-scale conversion section that performs second gray-scale conversion processing on an image using a second gray-scale conversion curve; and a display section that displays a composite gray-scale conversion curve combining the first and second gray-scale conversion curves.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principles of the invention.

DESCRIPTION OF THE PREFERRED EMBODIMENTS

Preferred embodiments of the present invention will be described in detail in accordance with the accompanying drawings.

First Embodiment

Figure 1:
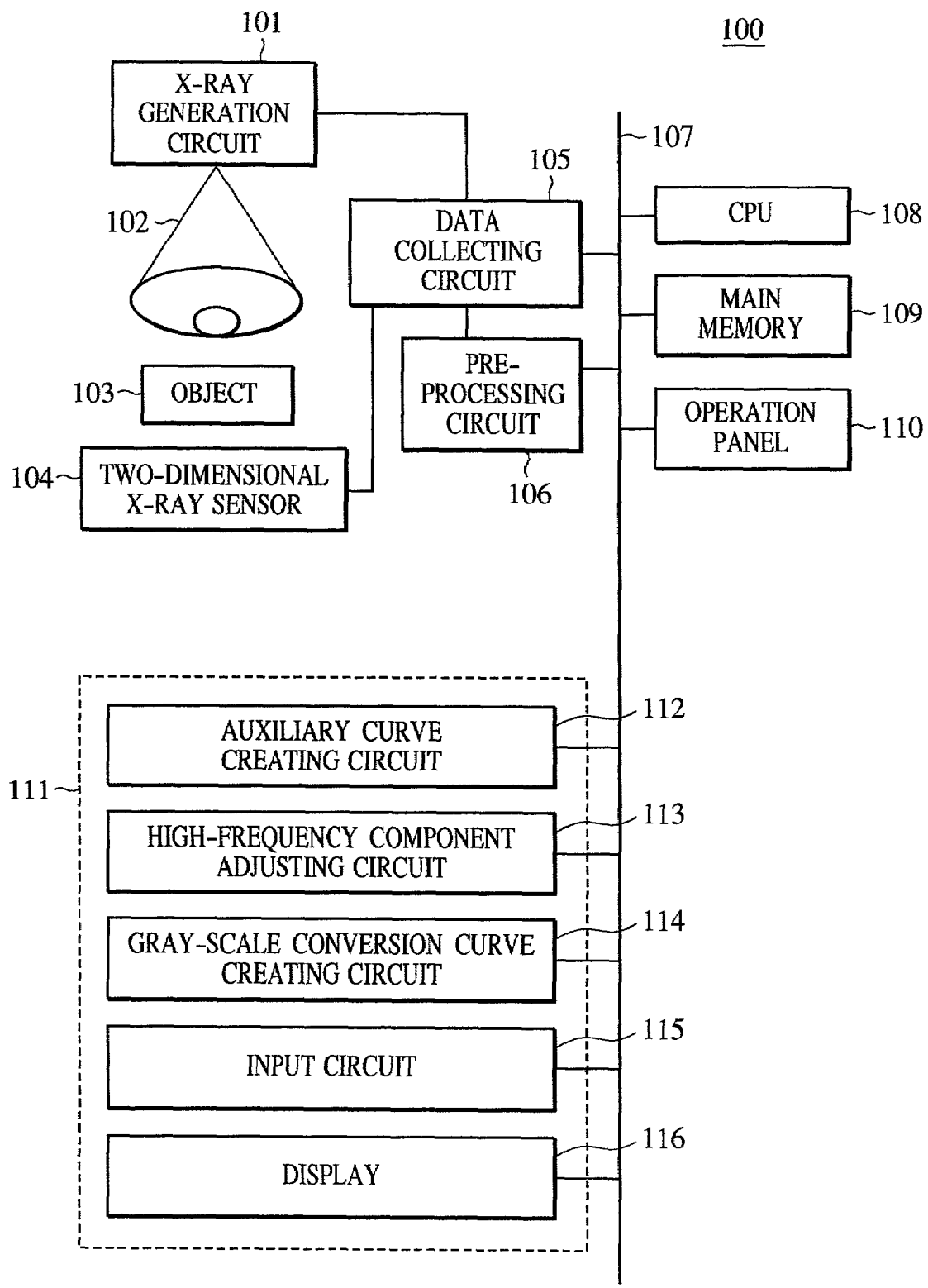
FIG. 1 a block diagram of the configuration of a radiographic apparatus according to first embodiment of the present invention.

FIG. 1 shows a radiographic apparatus 100 to which an image processing apparatus according to a first embodiment of the present invention is applied. Specifically, the radiographic apparatus 100 has an image processing function. The radiographic apparatus 100 contains a pre-processing circuit 106, a central processing unit (CPU) 108, a main memory 109, an operation panel 110, and an image processing circuit 111. These components are configured to exchange data with one another through a CPU bus 107.

The radiographic apparatus 100 contains a data collecting circuit 105 connected to the pre-processing circuit 106, a two-dimensional X-ray sensor 104 connected to the data collecting circuit 105, and an X-ray generation circuit 101. These circuits are also connected to the CPU bus 107.

With continued reference to FIG. 1, the configuration of the image processing circuit 111 will now be described. The image processing circuit 111 contains an auxiliary curve creating circuit 112, a high frequency component adjusting circuit 113, a gray-scale conversion curve creating circuit 114, an input circuit 115, and a display (display means) 116. The auxiliary curve creating circuit 112 creates an auxiliary curve for performing gray-scale conversion of an original image and converts the gray-scale of the original image using the auxiliary curve. The high frequency component adjusting circuit 113 creates a high frequency component of the original image, converts the high frequency component on the basis of the shape of the auxiliary curve created by the auxiliary curve creating circuit 112 and parameters input by the input circuit 115, and adds the converted high frequency component to the gray-scale-converted image generated by the auxiliary curve creating circuit 112. The gray-scale conversion curve creating circuit 114 creates a gray-scale conversion curve for performing gray-scale conversion of the image to which the high frequency component has been added by the high frequency component adjusting circuit 113 and performs gray-scale conversion. The input circuit 115 inputs parameters for adjusting the auxiliary curve to be created by the auxiliary curve creating circuit 112 and the amount of the high frequency component to be added by the high frequency component adjusting circuit 113. The display 116 displays a composite of the auxiliary curve created by the auxiliary curve creating circuit 112 and the gray-scale conversion curve created by the gray-scale conversion curve creating circuit 114 and the processed image.

Figure 2:
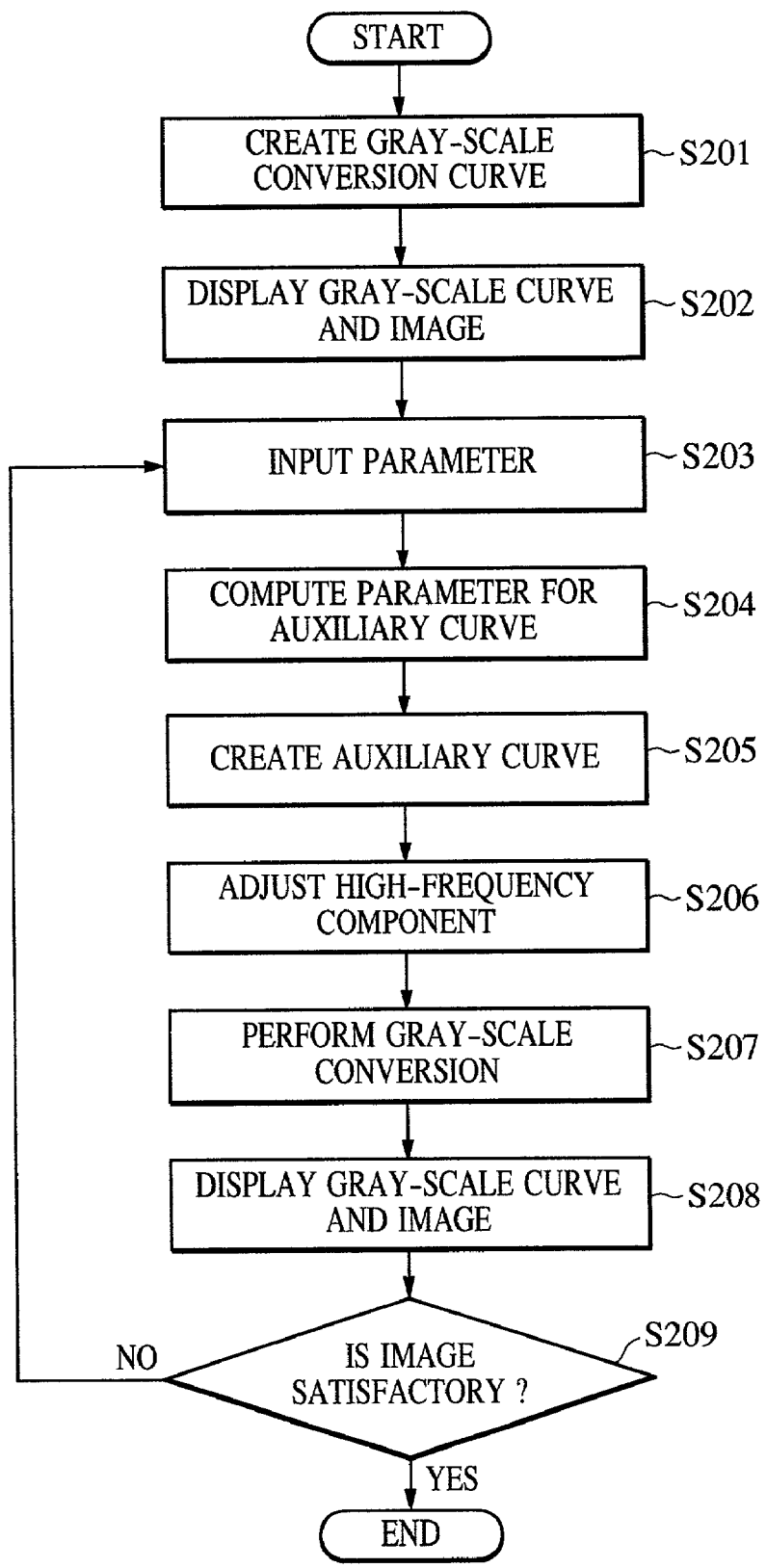
FIG. 2 is a flowchart showing a process performed in the first embodiment.
Figure 3:
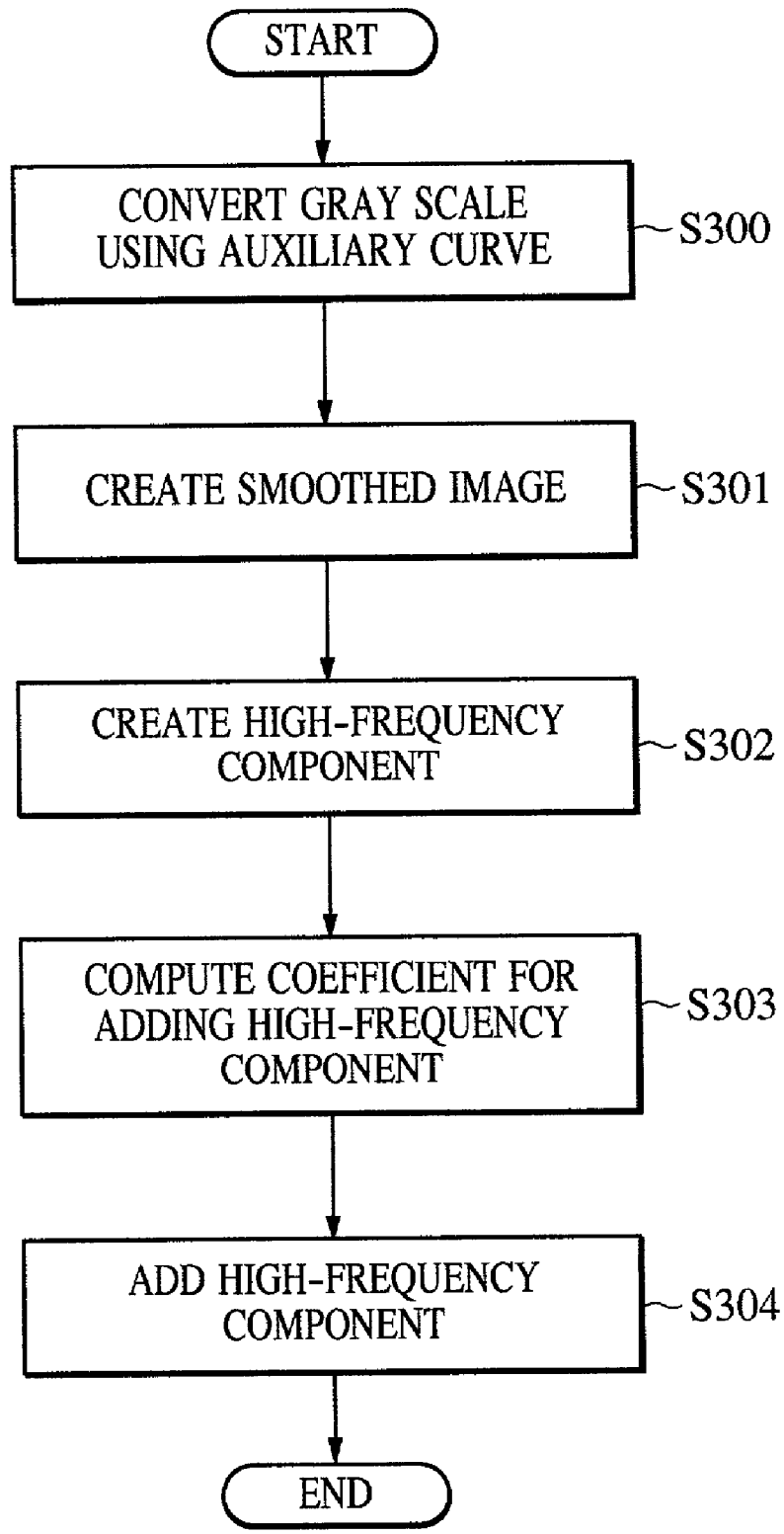
FIG. 3 is a flowchart showing a process of adjusting a high-frequency component in the first embodiment.

FIGS. 2 and 3, which are discussed below, are flowcharts showing processes performed in the first embodiment.

Figure 4:
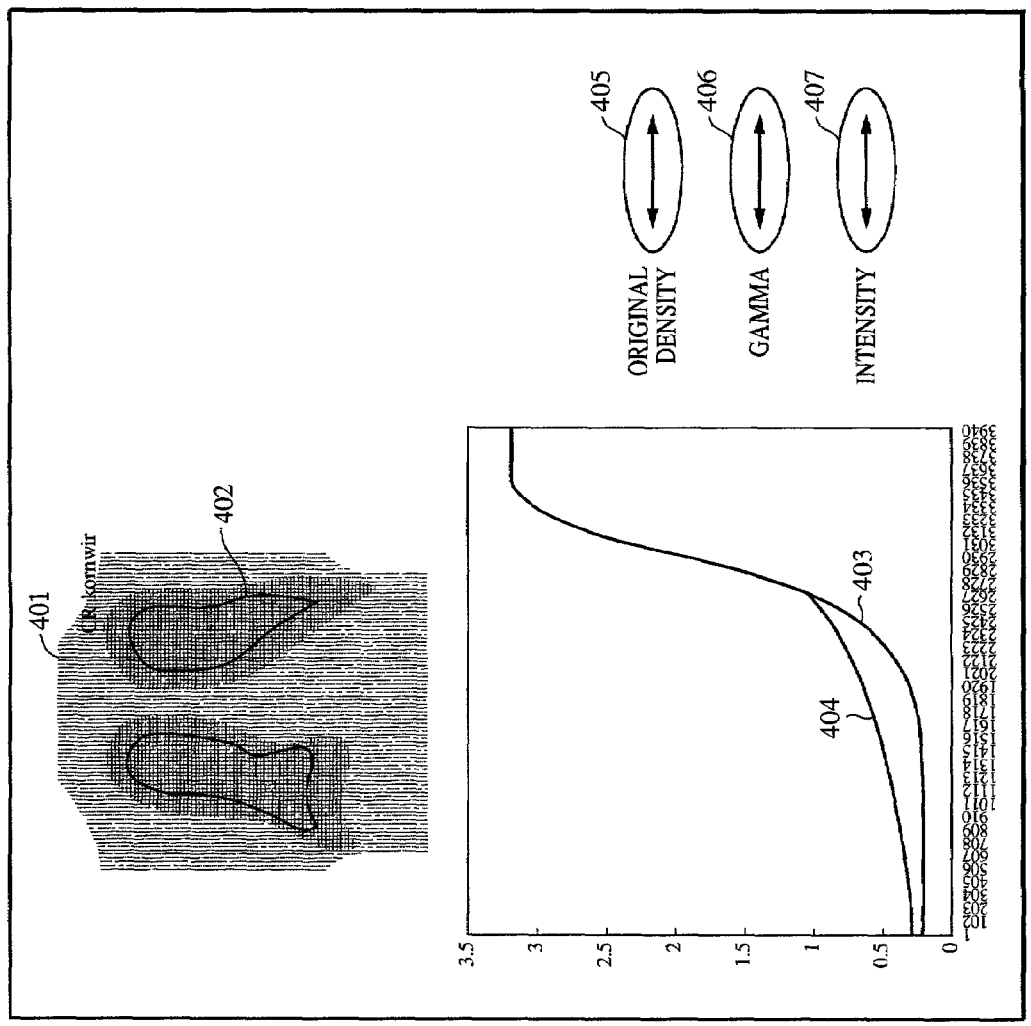
FIG. 4 illustrates images displayed on a display of the radiographic apparatus of FIG. 1.

FIG. 4 shows an example of an image displayed on the display 116. The display 116 displays: an image 401 generated by performing image processing of an image to be processed; an image region (pixels) 402 corresponding to a density level of a tuning point of the auxiliary curve which is one parameter required by the auxiliary curve-creating circuit 112 to create an auxiliary curve; an image region 402, which in this case is a curve, being displayed in terms of a predetermined pixel value; a gray-scale conversion curve 403 created by the gray-scale conversion curve creating circuit 114; and a curve (composite curve) 404 which is a composite of the gray-scale conversion curve and an auxiliary curve created by the auxiliary curve creating circuit 113. For example, in this graph, the horizontal axis represents the pixel value of an original image, and the vertical axis represents the density of the gray-scale-converted image.

Graphical portions 405, 406, and 407 are designed to display and adjust (1) the input parameters required by the auxiliary curve creating circuit 112 to create an auxiliary curve and (2) an intensity parameter for adding a high-frequency component by the high frequency component adjusting circuit 113. The portion 405 shows a density of a turning point corresponding to a density on a film. The portion 406 shows the slope of the auxiliary curve. The portion 407 shows the intensity for adding the high-frequency component.

Figure 5:
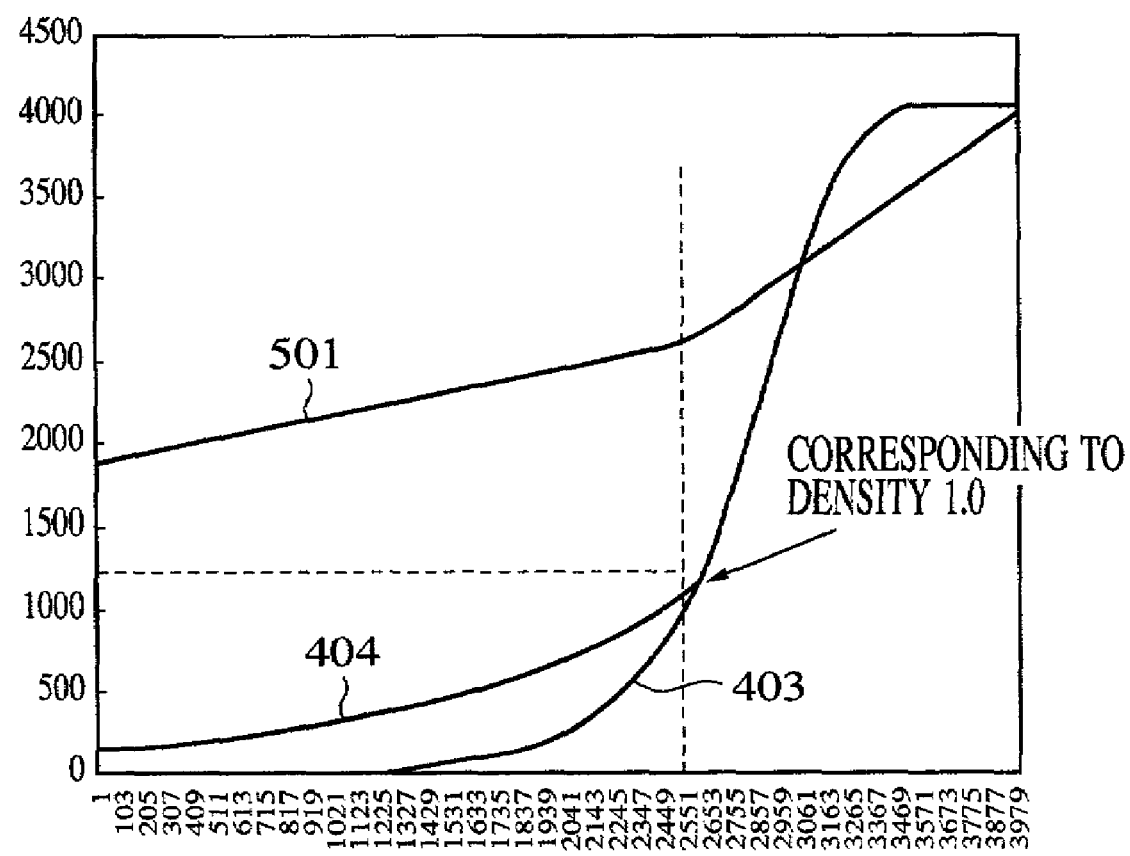
FIG. 5 is a graph showing an auxiliary curve, a gray-scale conversion curve, and a composite gray-scale conversion curve.

FIG. 5 shows an auxiliary curve 501 created by the auxiliary curve creating circuit 112. The auxiliary curve 501 is created, for a region in which the pixel value is less than or equal to a pixel value corresponding to the density of the turning point (density corresponding to the turning point of the multi-segment line, for example, 1.0), by setting a slope in accordance with a slope parameter input in the portion 406.

Figure 6:
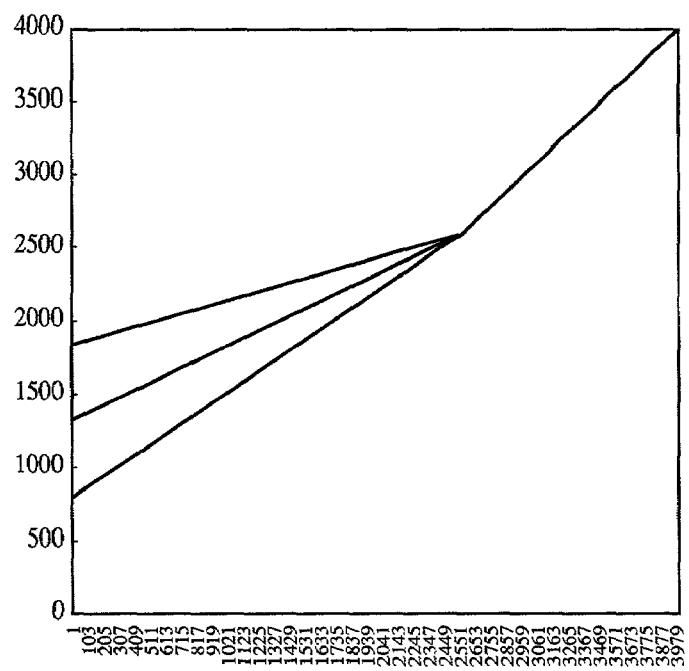
FIG. 6 is a graph showing a plurality of auxiliary curves for changing the dynamic range.
Figure 7:
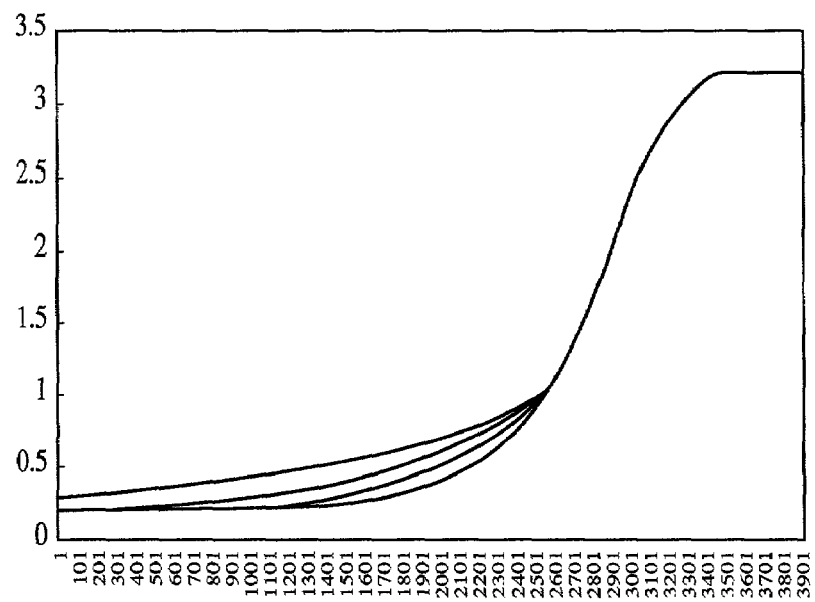
FIG. 7 is a graph showing a composite gray-scale conversion curve combining the auxiliary curves shown in FIG. 6 and a gray-scale conversion curve.
Figure 8:
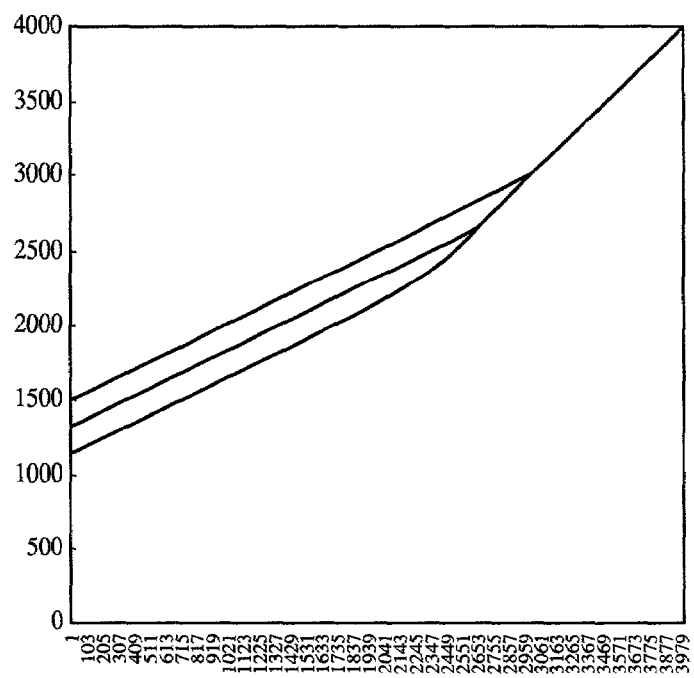
FIG. 8 is a graph showing a plurality of auxiliary curves for changing the dynamic range.
Figure 9:
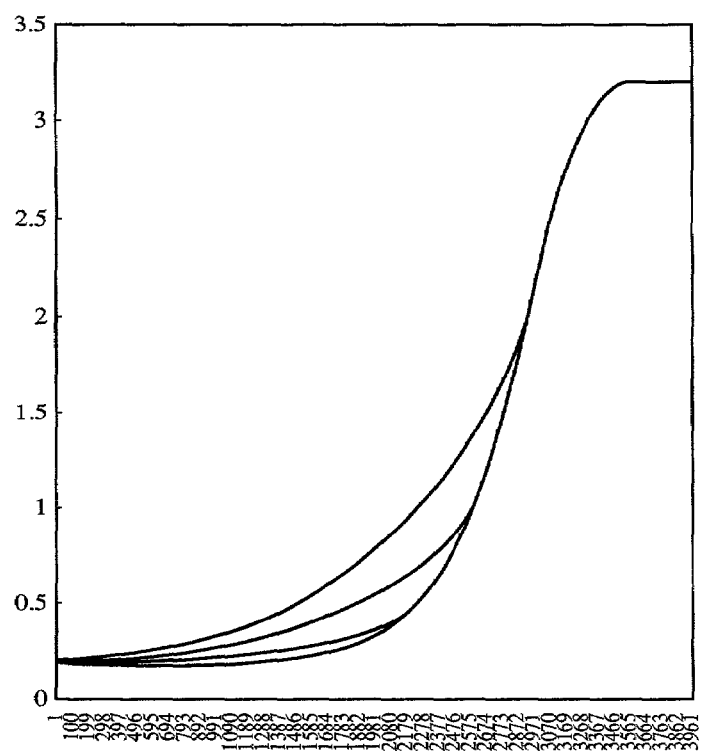
FIG. 9 is a graph shown a composite gray-scale conversion curve combining the auxiliary curves shown in FIG. 8 and a gray-scale conversion curve.

FIG. 6 shows examples of auxiliary curves created by the auxiliary curve creating circuit 112. FIG. 7 shows a composite of these auxiliary curves and a gray-scale conversion curve created by the gray-scale conversion curve creating circuit 114. FIG. 8 shows examples of auxiliary curves created by the auxiliary curve creating circuit 112. FIG. 9 shows a composite of these auxiliary curves and a gray-scale conversion curve created by the gray-scale conversion curve creating circuit 114.

Referring again to FIG. 1, in the radiographic apparatus 100, the main memory 109 stores various data required for processing by the CPU 108. Also, the main memory 109 functions as a work memory for the CPU 108.

Using the main memory 109, the CPU 108 controls the operation of the entire apparatus in accordance with operation instructions from the operation panel 110. Accordingly, the radiographic apparatus 100 operates in the following manner.

The X-ray generation circuit 101 emits an X-ray beam 102 to an object 103 to be tested.

The X-ray beam 102 emitted from the X-ray generation circuit 101 passes through the object 103 while being attenuated and reaches the two-dimensional X-ray sensor 104. The two-dimensional X-ray sensor 104 detects an X-ray image and outputs an electrical signal representing image information. In this example, the X-ray image output by the two-dimensional X-ray sensor 104 is a human body image.

The data collecting circuit 105 converts the electrical signal output from the two-dimensional X-ray sensor 104 into a predetermined electrical signal and supplies the predetermined electrical signal to the pre-processing circuit 106. The pre-processing circuit 106 performs pre-processing, such as offset correction and gain correction, of the signal (X-ray image signal) from the data collecting circuit 105. The X-ray image signal, after being subjected to pre-processing by the pre-processing circuit 106, is transferred, under the control of the CPU 108, to the main memory 109 and the image processing circuit 111 through the CPU bus 107.

The operation of the image processing circuit 111 will now be described with reference to FIGS. 2 and 3.

The gray-scale conversion curve creating circuit 115 which has received an original image f(x, y) processed by the pre-processing circuit 106 through the CPU bus 107 under the control of the CPU 108 creates a gray-scale conversion curve F( ) and converts the gray-scale of the original image f(x, y) as follows (S201):

$$P(x, y) = F(f(x, y)) \quad (101)$$

where f(x, y) represents a pixel value of the original image, x and y represent coordinates on the original image, and P(x, y) represents a pixel value of the gray-scale-converted image. In this example, the reference gray-scale conversion curve F( ) is, for example, the curve 403 shown in FIG. 4.

The display 116 displays the gray-scale-converted image P(x, y), which is, for example, the image 401 shown in FIG. 4. The display 116 also displays the gray-scale conversion curve 403 and the portions 405, 406, and 407 for inputting parameters (S202).

Looking at the image 401, an operator inputs a density range to be subjected to gray-scale conversion and parameters for adjusting the slope of the auxiliary curve and the intensity for adding a high-frequency component using the portions 405, 406, and 407 under the control of the input circuit 115. The portions 405, 406, and 407 function as a graphical user interface. By clicking the portions 405, 406, and 407 using a mouse, the parameters can be input. For example, when the operator clicks the rightward arrow → in the portion 405, the density of the turning point is changed toward the "+" side. The changed parameter is displayed as a value (not shown) at, for example, the right side of the rightward arrow. When the operator clicks the leftward arrow ← in the portion 406, the gamma (slope of the auxiliary curve) is changed to the "−" side. The changed parameter is displayed at, for example, the right side of the rightward arrow. When the display 116 contains a touch panel, the parameters can be changed by directly touching the arrows in the portions 405, 406, and 407. These operations are under the control of the input circuit 115. The changed parameters are fetched in the input circuit 115 (S203).

From the parameters fetched in the input circuit 115, a parameter for creating an auxiliary curve is computed. For example, when the density of the turning point 1.0 is fetched in the input circuit 115, a corresponding pixel value is computed from a gray-scale conversion function (gray-scale conversion characteristic) of the gray-scale conversion curve 403, as shown by equation (102) (S204):

$$X = F^{-1}(Y) \quad (102)$$

The pixel value corresponding to the density of the turning point 1.0, which is computed by equation (102), is X1.

The auxiliary curve creating circuit 112 creates an auxiliary curve in accordance with the parameters computed by the input circuit 115 (103) (S205):

$$Y = G(X) \quad (103)$$

where X is an input pixel value and Y is an output pixel value.

The specific shape of the auxiliary curve G( ) is expressed by equations (104) and (105):

In a pixel-value region in which the pixel value X>X1, $$Y = X \quad (104)$$

In a pixel-value region in which the pixel value X≦X1, $$Y = A(p1) \times X + B(X1) \quad (105)$$

where A( ) is a value determined from the parameter p1 fetched by the input circuit 115 from the portion 406 using a linear equation expressed by equation (106), the slope of the auxiliary curve is changed by the parameter p1, and C is a constant:

$$A(p1) = C \times p1 \quad (106)$$

B( ) is computed on the basis of X1 computed by the input circuit 115 as expressed by:

$$B(X1) = (1 - A(p1)) \times X1 \quad (107)$$

In a case when changing the dynamic range (density or pixel value range) of an image region at a level less than or equal to the density of the turning point 1.0, and when A(p1)=0.5, the auxiliary curve 501 shown in FIG. 5 is generated. The slope of the auxiliary curve corresponding to a pixel value which is less than or equal to the pixel value X1 corresponding to the density of the turning point is A(p1). The auxiliary curve is defined by two lines having different slopes. One line passes through the turning point and the slope thereof is 1, and the other line is defined by two parameters (density of the turning point and slope (gamma)). By adjusting the two parameters, the shape of the auxiliary curve can be easily changed.

In this case, the auxiliary curve is created by two lines in order to simplify the description. However, it is preferable that differential values of the auxiliary curve be continuous (that the slope of the auxiliary curve change smoothly) by arranging the curve shape as described in Japanese Patent Laid-Open No. 2000-276590 applied for by the applicant of the present invention, that is, by arranging the curve shape by inscribing a circle in two lines. When the differential values of the auxiliary curve are discontinuous, artifacts such as a pseudo-contour are easily generated due to the discontinuous points. In other words, it is preferable that the auxiliary curve (excluding both ends) be a continuous and differentiable curve.

The high frequency component adjusting circuit 113 adjusts the high-frequency component (S206). The adjusting process is described in detail with reference to the flowchart shown in FIG. 3 using a method described in Japanese Patent Laid-Open No. 2000-101841 applied for by the applicant of the present invention. Specifically, the high frequency component adjusting circuit 113 performs gray-scale conversion using the auxiliary curve G( ) created by the auxiliary curve creating circuit 112 in accordance with equation (108) (S300):

$$f1(x, y)=G(f(x, y)) \qquad (108)$$

where f1(x, y) indicates an image after being subjected to gray-scale conversion using the auxiliary curve.

The high frequency component adjusting circuit 113 creates a smoothed image fus(x, y) of the original image f(x, y) in accordance with equation (109) (S301):

$$fus(x, y) = \frac{\int_{-d}^{d}\int_{-d}^{d} f(x+x1, y+y1)dx1dy1}{\int_{-d}^{d}\int_{-d}^{d} dx1dy1} \qquad (109)$$

where d is a constant representing the size of a mask.

A high-frequency component fh(x, y) of the original image is computed by equation (110) (S302):

$$fh(x, y)=f(x, y)-fus(x, y) \qquad (110)$$

The high frequency component adjusting circuit 113 computes a coefficient c(χ) for adding the high-frequency component from the differential coefficient (slope) of the auxiliary curve and a parameter p3 input in the portion 407 in accordance with equation (111) (S303):

$$c(\chi) = p3 \times \left(1 - \frac{\partial G(\chi)}{\partial \chi}\right) \qquad (111)$$

wherein $\chi = f(x, y)$

When p3=1, the amplitude of the high-frequency component of the image does not change prior and subsequent to dynamic range changing processing using the auxiliary curve. When noise is noticeable in a low-density region of the image, the amount of the high-frequency component to be added can be reduced by making p3 less than 1. Thus, a processed image in which noise is less noticeable can be generated. In order to emphasize the high-frequency component, p3 can be made greater than 1. When p3=0, the dynamic range changing processing has the same effects as normal gray-scale conversion.

The high frequency component adjusting circuit 113 adds the high-frequency component fh(x, y) to the image f1(x, y) on the basis of the coefficient c(χ) in accordance with equation (112) and generates a processed image f2(x, y) (S304):

$$f2(x, y)=f1(x, y)+c(f(x, y))\times fh(x, y) \qquad (112)$$

The gray-scale conversion curve creating circuit 114 performs gray-scale conversion in accordance with equation (113), thus generating a gray-scale-converted image f3(x, y) (S207):

$$f3(x, y)=F(f2(x, y)) \qquad (113)$$

The gray-scale-conversion circuit 114 creates a composite gray-scale conversion curve F2( ) expressed by equation (114):

$$Y=F2(\chi)=F(G(\chi)) \qquad (114)$$

For example, the curve 404 is a composite gray-scale conversion curve, expressed by equation (114), combining the auxiliary curve 501 and the gray-scale conversion curve 403.

The display 116 displays the gray-scale conversion curve 403, the composite gray-scale conversion curve 404, and the processed image f3(x, y). Also, the display 116 displays the pixel-value region 402 corresponding to the density of the turning point (such as 1.0) (S208).

As described above, the dynamic range (partial density or pixel-value range) to be changed and the degree of change can be easily recognized by displaying the gray-scale conversion curve and the composite gray-scale conversion curve. Accordingly, the region (partial density or pixel-value region) in which the dynamic range (partial density or pixel-value range) and the rate (degree) of change are changed can be appropriately adjusted. By simultaneously displaying the processed image and the composite gray-scale curve, the relationship between the rate or degree of change or the processed image and the composite gray-scale curve can be directly observed. It is thus possible to easily adjust the parameters for changing the dynamic range. By displaying, on the image, the region 402 corresponding to the density of the turning point, the operator can accurately recognize, from the image, an image region which corresponds to the density of the turning point and which is to be subjected to dynamic range (partial density or pixel-value range) changing processing. By displaying the region 402 and the gray-scale conversion curves 403 and 404, it is possible to adjust the parameters more precisely.

The operator looks at the image after it is subjected to image processing, the region 402, and the gray-scale conversion curves 403 and 404, all of which are displayed, and determines whether or not an observable image or a desired image is created. Subsequently, the operator provides predetermined input. When the determination is affirmative, the process is terminated. When the determination is negative, the processing from step S203 onward can be repeated (S209). The image data which has been completely processed is transferred to a predetermined apparatus if necessary, and the image data is recorded, displayed, stored, or re-transferred. Generally, the image data is recorded by a printer (not shown) on a film.

In the above description, the slope of the gray-scale conversion curve corresponding to a level less than or equal to the density of the turning point is changed. Needless to say, the slope of the gray-scale conversion curve at a level greater than or equal to the density of the turning point can be changed by a similar method, or the slope of the gray-scale conversion curve at a density lower than a predetermined density of the turning point and at a density higher than a predetermined density of a turning point can be changed by a similar method.

According to the first embodiment, by displaying the gray-scale conversion curve and the composite curve of the gray-scale conversion curve and the auxiliary curve for changing the dynamic range, the relationship between the dynamic range changing processing and the gray-scale converting processing can be easily recognized. Accordingly, it is possible to easily adjust the parameters for changing the dynamic range and thus to appropriately change the dynamic range.

Since means for changing the parameters of the auxiliary curve is provided, the shape of the auxiliary curve can be easily changed, and the region (partial density or pixel-value range) in which the dynamic range (partial density or pixel-value range) is to be changed and the degree of change can be easily changed. Since means for changing the parameter for adjusting the intensity for adding the high-frequency component is provided, it is possible to adjust the intensity for adding the high-frequency component in accordance with an image.

By changing the intensity for adding the high-frequency component depending on the slope of the auxiliary curve, in which the image which has been subjected to dynamic range changing processing, the amplitude of the high-frequency component of the image prior to being subjected to the dynamic range changing processing can be conserved.

By simultaneously displaying the processed image, the gray-scale conversion curve, and the composite gray-scale conversion curve, the operator can easily recognize the relationship between the gray-scale conversion curves and the processed image. Thus, an operation of setting the auxiliary curve can be facilitated, and a desired image which can be satisfactorily observed is easily generated. By displaying, on the image, the relationship between the set parameter values and the contents of image processing (for example, the distribution of the density of the turning point in the processed image), image processing effects corresponding to the parameter values (for example, an image region in which the density or pixel-value range is to be changed) can be directly, visually, or intuitively recognized. It is thus possible to easily or quickly set the parameters.

Second Embodiment

A second embodiment of the present invention will now be described.

Figure 10:
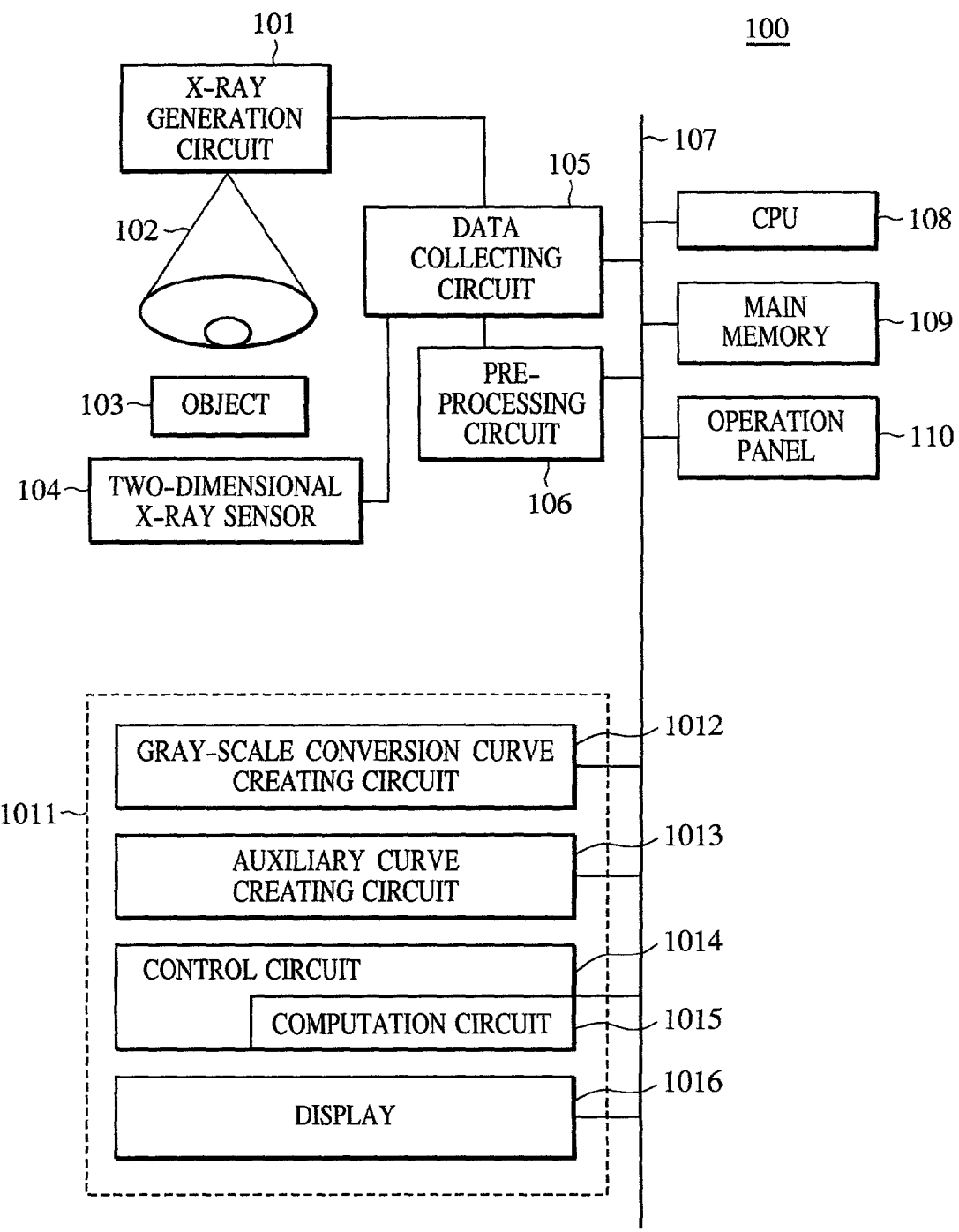
FIG. 10 is a block diagram showing the configuration of a radiographic apparatus according to a second embodiment of the present invention.

FIG. 10 shows the configuration of the radiographic apparatus 100 to which an image processing apparatus according to the second embodiment of the present invention is applied. Descriptions of components and processes similar to those in the first embodiment are omitted.

Referring to FIG. 10, the configuration of an image processing circuit 1011 will now be described. The image processing circuit 1011 contains the following circuits. A gray-scale conversion curve creating circuit 1012 creates a gray-scale conversion curve which is used as a reference for performing gray-scale conversion (hereinafter referred to as a reference gray-scale conversion curve) or a changed gray-scale conversion curve and performs gray-scale conversion of an original image. An auxiliary curve creating circuit 1013 creates an auxiliary curve for changing the shape of the gray-scale conversion curve created by the gray-scale conversion curve creating circuit 1012. A control circuit 1014 is provided to input parameters for changing the shape of the auxiliary curve created by the auxiliary curve creating circuit 1013. A computation circuit 1015, which is associated with the control circuit 1014, computes parameters required by the auxiliary curve creating circuit 1013 to create the auxiliary curve. A display 1016 displays an image generated by performing gray-scale conversion using the reference gray-scale conversion curve or the changed gray-scale conversion curve, the reference gray-scale conversion curve and/or the changed gray-scale conversion curve, and graphical portions displaying the parameters input to the auxiliary curve creating circuit 1013.

Figure 11:
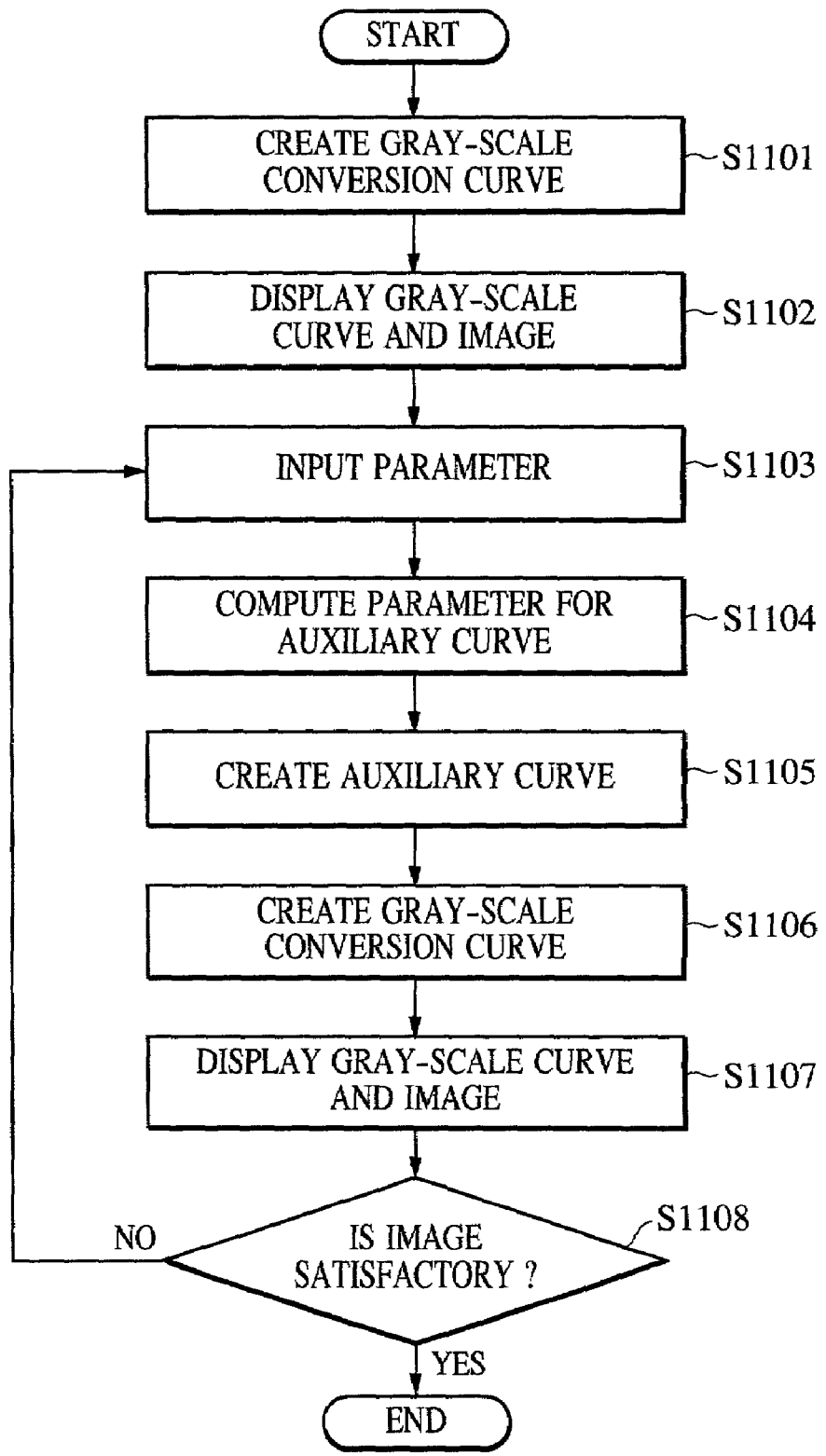
FIG. 11 is a flowchart showing a process performed in the second embodiment.

FIG. 11 is a flowchart showing a process performed in the second embodiment that is discussed in detail below.

Figure 12:
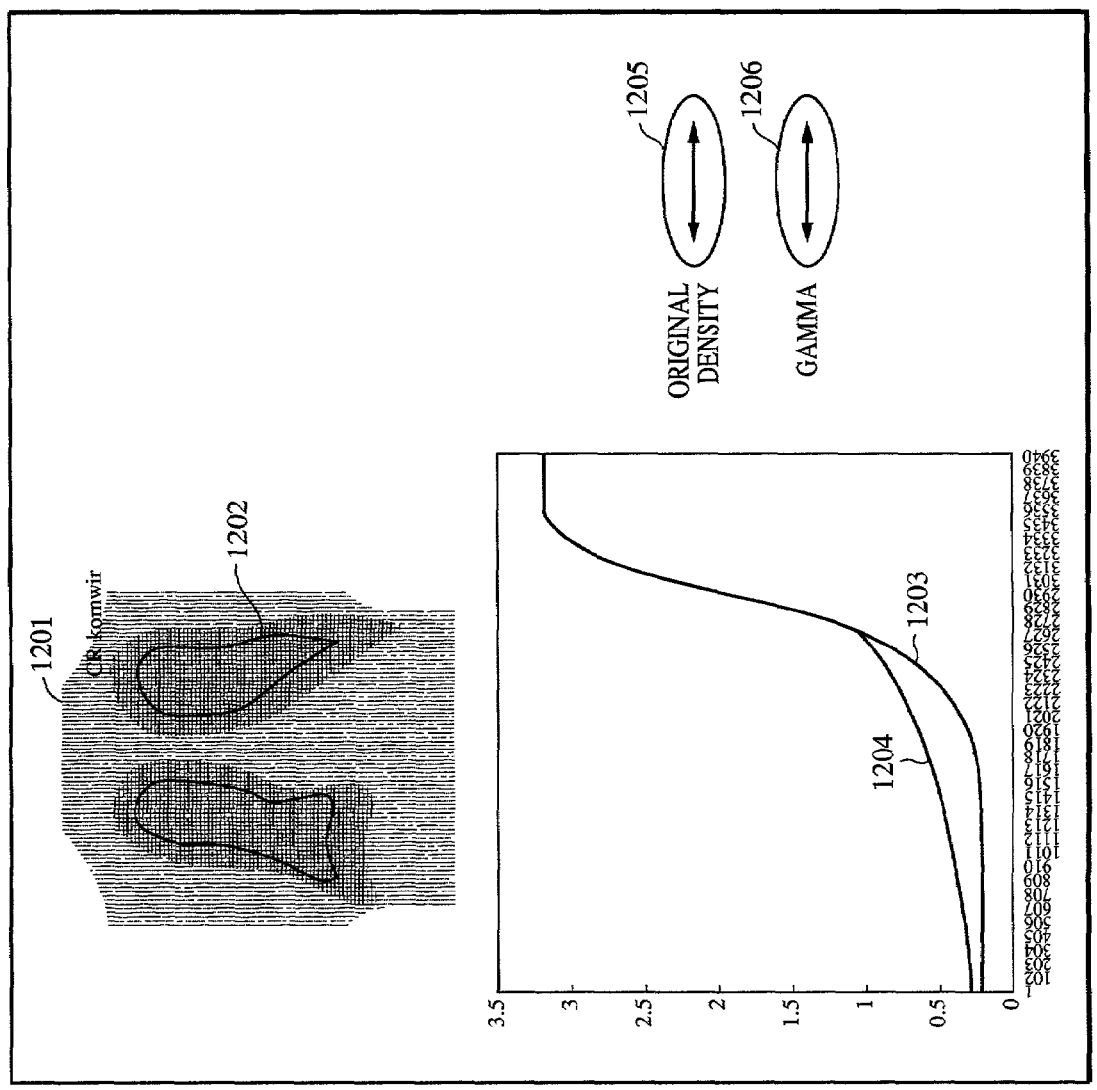
FIG. 12 illustrates images displayed on the display of the radiographic apparatus of FIG. 10.

FIG. 12 shows an example of an image displayed on the display 1016. The display 1016 displays: an image 1201 generated by performing gray-scale conversion of an image to be subjected to gray-scale conversion; an image region (pixels) 1202 corresponding to a density of a turning point of the auxiliary curve which is one parameter required by the auxiliary curve-creating circuit 1013 to create an auxiliary curve; image region 1202, which in this case is a curve, being displayed in terms of a predetermined pixel value; a reference gray-scale conversion curve 1203; and a changed gray-scale conversion curve 1204 which is obtained by changing the reference gray-scale conversion curve 1203 using the auxiliary curve. For example, in the graph illustrated in FIG. 12, the horizontal axis represents the pixel value of an original image, and the vertical axis represents the density of the gray-scale-converted image.

Graphical portions 1205 and 1206 are used for the control circuit 1014 to display and adjust parameters that are used to input parameters for creating the auxiliary curve. The portion 1205 shows a density of a turning point corresponding to a density on a film. The portion 1206 shows the slope (gamma) of the auxiliary curve.

Figure 13:
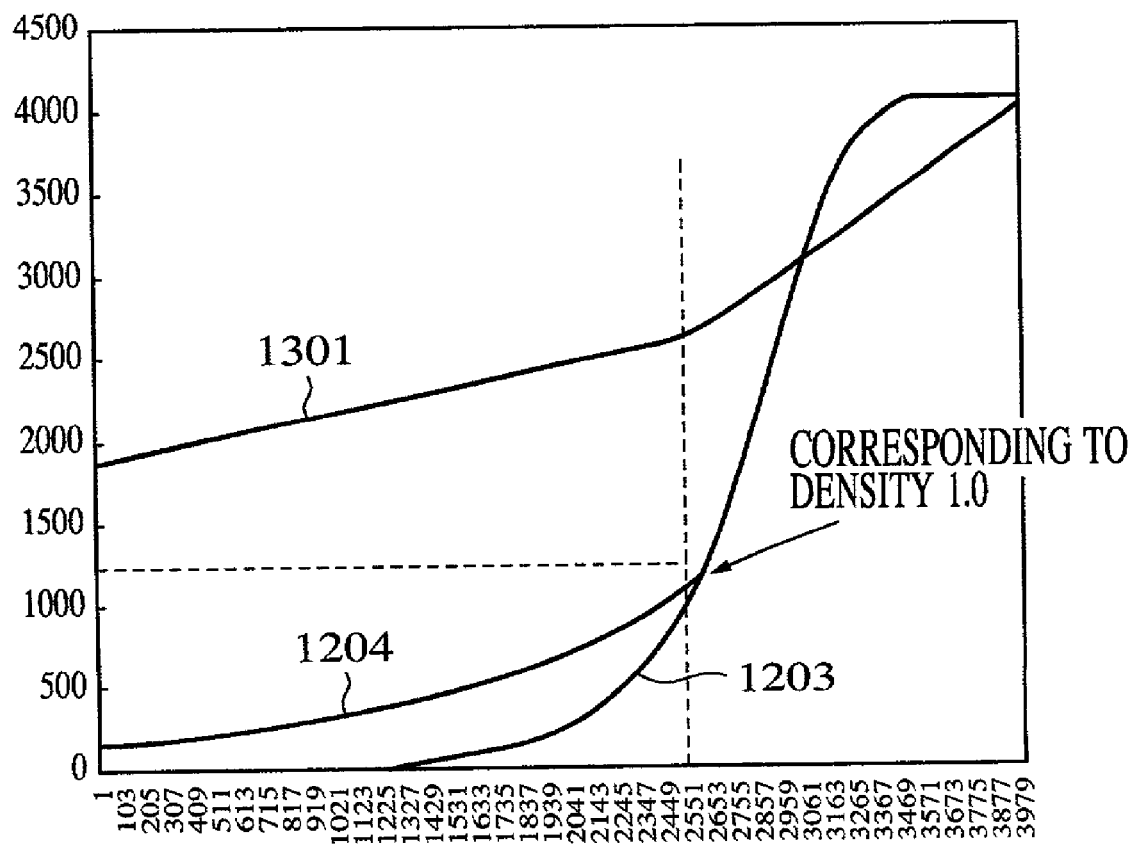
FIG. 13 is a graph showing an auxiliary curve, a reference gray-scale conversion curve, and a changed gray-scale conversion curve.

FIG. 13 shows an auxiliary curve 1301 used to change the reference gray-scale conversion curve 1203 to the changed gray-scale conversion curve 1204. The auxiliary curve 1301 is created, for a region in which the pixel value is less than or equal to a pixel value corresponding to the density of the turning point (for example 1.0) input in the portion 1205, and by setting a slope in accordance with a slope parameter input in the portion 1206.

Figure 14:
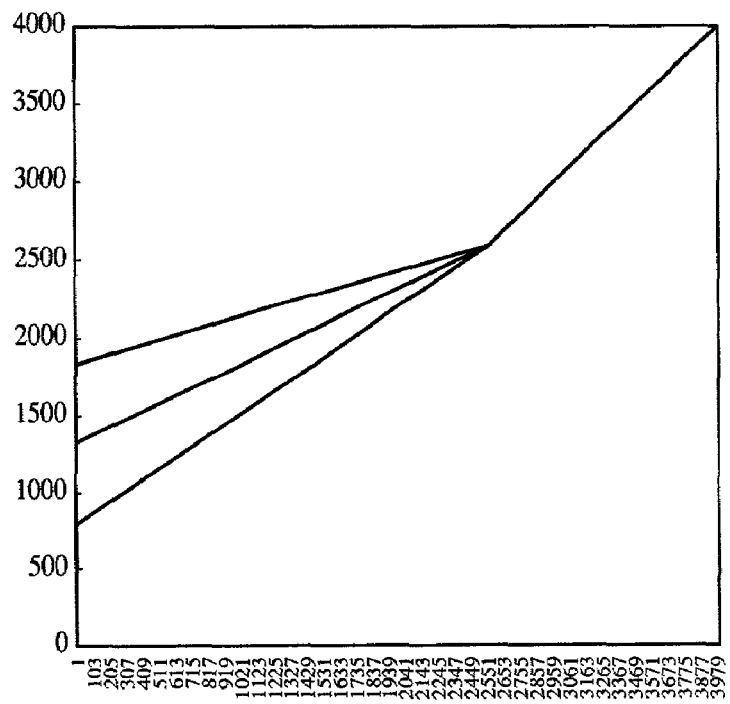
FIG. 14 is a graph showing a plurality of auxiliary curves for changing the slope of a gray-scale conversion curve.
Figure 15:
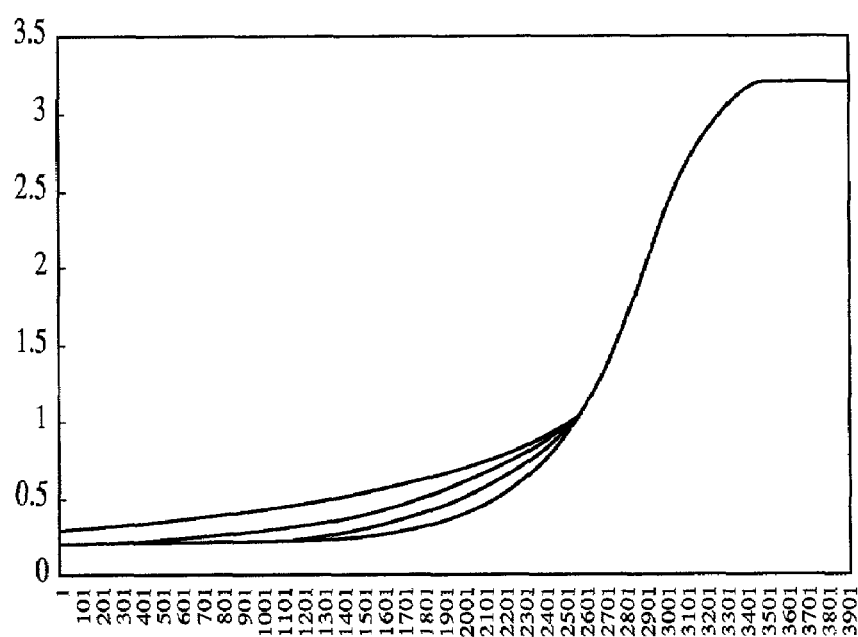
FIG. 15 is a graph showing a plurality of gray-scale conversion curves whose slopes have been changed.
Figure 16:
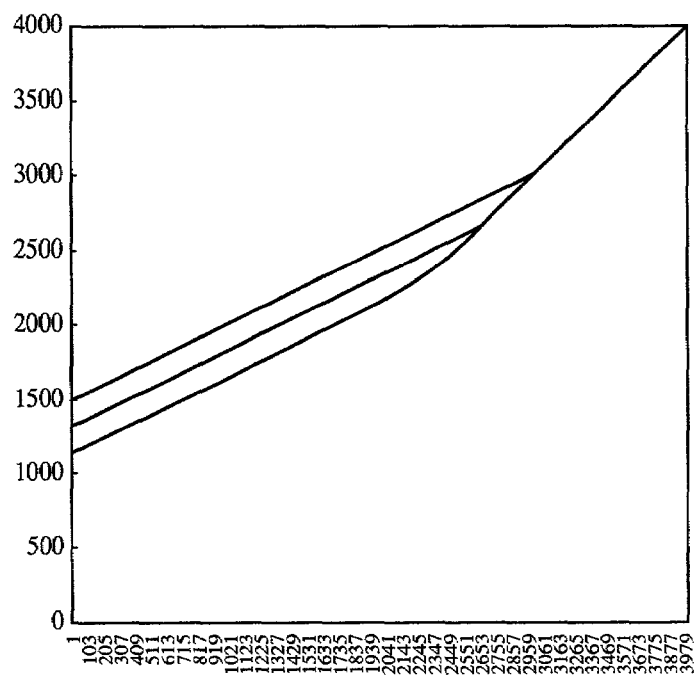
FIG. 16 is a graph showing a plurality of auxiliary curves for changing a pixel-value range for changing the slope of a gray-scale conversion curve.
Figure 17:
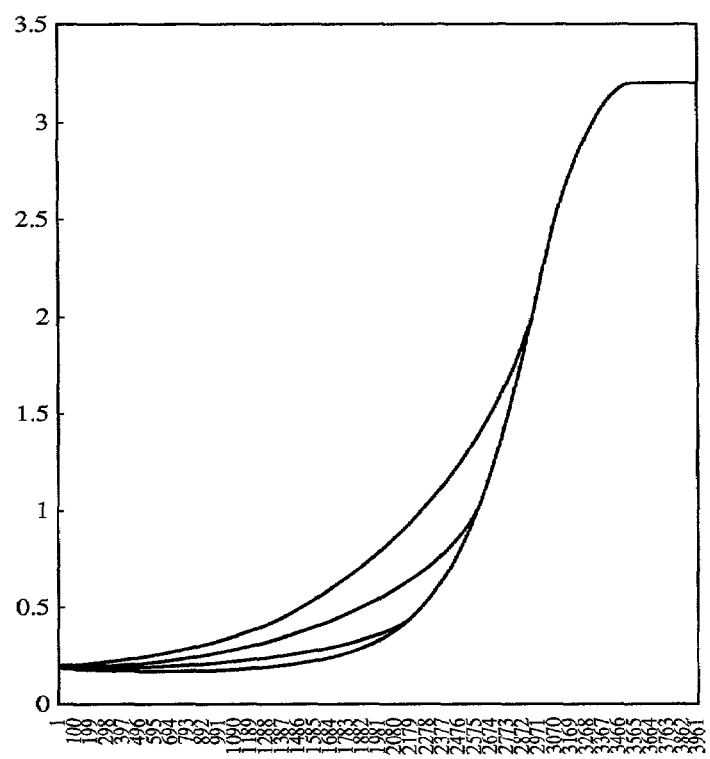
FIG. 17 is a graph showing a plurality of gray-scale conversion curves with slopes which have been changed, gray-scale conversion curves having different pixel-value ranges.

FIGS. 14 and 16 show examples of auxiliary curves created by the auxiliary curve creating circuit 1013. FIGS. 15 and 17 show gray-scale conversion curves which are obtained by changing the reference gray-scale conversion curve using these auxiliary curves. The auxiliary curves in FIG. 14 correspond to the changed gray-scale conversion curve in FIG. 15, and the auxiliary curves in FIG. 16 correspond to the changed gray-scale conversion curve in FIG. 17.

The operation of the image processing circuit 1011 will now be described with reference to FIG. 11.

The gray-scale conversion curve creating circuit 1012 which has received, through the CPU bus 107, an original image f(x, y) processed by the pre-processing circuit 106 under the control of the CPU 108 creates a reference gray-scale conversion curve F( ) and performs gray-scale conversion of the original image in accordance with equation (201) (S1101):

$$P(x, y)=F(f(x, y)) \quad (201)$$

where f(x, y) represents a pixel value of the original image, x and y represent coordinates on the original image, and P(x, y) represents a pixel value of the gray-scale-converted image. For example, the reference gray-scale conversion curve F( ) is the curve 1203 shown in FIG. 12.

The display 1016 displays the gray-scale-converted image P(x, y), such as the image 1201. Also, the display 1016 displays the reference gray-scale conversion curve 1203 and the portions 1205 and 1206 for inputting the parameters (S1102).

The operator looks at the image 1201 and inputs, under the control of the control circuit 1014, a density region (density of the turning point) which is to be subjected to gray-scale (density) conversion and the slope of the auxiliary curve using the portions 1205 and 1206 which function as a graphical user interface. For example, by clicking the portions 1205 and 1206 using a mouse, the parameters can be input. For example, when the operator clicks the rightward arrow → in the portion 1205, the density of the turning point is changed toward the "+" side. The changed parameter is displayed as a value (not shown) at, for example, the right side of the rightward arrow. When the operator clicks the leftward arrow ← in the portion 1206, the gamma (slope) is changed to the "−" side. The changed parameter is displayed as a value at, for example, the right side of the rightward arrow. When the display 1016 contains a touch panel, the parameters can be changed by directly touching the arrows in the portions 1205 and 1206. These operations are under the control of the control circuit 1014. The changed parameters are fetched in the control circuit 1014 (S1103).

The parameters which are fetched in the control circuit 1014 are transferred to the computation circuit 1015. The computation circuit 1015 computes a parameter for creating an auxiliary curve. For example, when the density of the turning point 1.0 is supplied to the computation circuit 1015, the computation circuit 1015 computes a pixel value corresponding to the density of the turning point on the basis of the reference gray-scale conversion curve F( ) 1203 in accordance with equation (202):

$$X=F^{-1}(Y) \quad (202)$$

The pixel value corresponding to the density of the turning point 1.0, which is computed by equation (202), is X1.

The auxiliary curve creating circuit 1013 creates an auxiliary curve in accordance with equation (203) using the parameters computed by the control circuit 1014 and the computation circuit 1015:

$$Y=G(X) \quad (203)$$

where X represents an input pixel value, and Y represents an output pixel value. The specific shape of the auxiliary curve G( ) is shown by equations (204) and (205):

In a pixel-value region in which the pixel value X>X1, $$Y=X \quad (204)$$

In a pixel-value region in which the pixel value X≦X1, $$Y=A(p1){\times}X+B(X1) \quad (205)$$

where A( ) is a value determined, by the control circuit 1014, from the parameter p1 fetched from the portion 1206 using a linear function expressed by equation (206), the slope of the auxiliary curve is changed by the parameter p1, thereby changing the slope of the gray-scale conversion curve, and C is a constant:

$$A(p1)=C{\times}p1 \quad (206)$$

B( ) is computed on the basis of X1 computed by the computation circuit 1015 in accordance with equation (207):

$$B(X1)=(1-A(p1)){\times}X1 \quad (207)$$

In a case when changing the slope of the gray-scale conversion curve in the pixel-value region corresponding to a level less than or equal to the density of the turning point 1.0, and when A(p1)=0.5, the auxiliary curve 1301 shown in FIG. 13 is generated. The slope of the auxiliary curve at a pixel value which is less than or equal to the pixel value X1 corresponding to the density of the turning point is A(p1). The auxiliary curve is defined by two lines having different slopes. One line passes through the turning point and the slope thereof is 1, and the other line is defined by two parameters (density of the turning point and slope (gamma)). By adjusting the two parameters, the shape of the auxiliary curve can be easily changed.

In this case, the auxiliary curve is created by the two lines in order to simplify the description. However, it is preferable that differential values of the auxiliary curve be continuous (that the slope of the auxiliary curve change smoothly) by arranging the curve shape as described in Japanese Patent Laid-Open No. 2000-276590 applied for by the applicant of the present invention, that is, by arranging the curve shape by inscribing a circle in two lines. When the differential values of the auxiliary curve are discontinuous, artifacts such as a pseudo-contour are easily generated due to the discontinuous points. In other words, it is preferable that the auxiliary curve (excluding both ends) be a continuous and differentiable curve.

The gray-scale conversion curve creating circuit 1012 creates a changed gray-scale conversion curve F2( ) in accordance with equation (208) (S1106):

$$Y=F2(X)=F(G(X)) \quad (208)$$

For example, as illustrated in FIG. 13, the reference gray-scale conversion curve 1203 is changed using the auxiliary curve 1301, thus generating the changed gray-scale conversion curve 1204.

The gray-scale conversion curve creating circuit 1012 uses the changed gray-scale conversion curve expressed by equation (208) to perform gray-scale conversion of the original image.

The reference gray-scale conversion curve F( ) and the changed gray-scale conversion curve F2( ) are compared with each other. The slope of the reference gray-scale conversion curve F( ) at a level which is less than or equal to the pixel value X1 corresponding to the density of the turning point is changed in accordance with the parameter p1. By inputting the two parameters, it is possible to easily designate changing of the reference gray-scale conversion curve (changing of the slope and the range of change).

When the reference gray-scale conversion curve is formed by many parameters (for example, six parameters in equation (13)), the slope of the curve cannot be changed unless many parameters are adjusted. In the second embodiment, the shape of the reference gray-scale conversion curve can be changed by using the auxiliary curve and changing two parameters. Even when the reference gray-scale conversion curve is fixed, the shape of the reference gray-scale conversion curve can be easily changed using the auxiliary curve. By moving the auxiliary curve horizontally or vertically, the changed gray-scale conversion curve can also be moved horizontally or vertically.

Referring again to FIG. 12, the display 1016 displays the reference gray-scale conversion curve 1203, the changed gray-scale conversion curve 1204, and the image after it is subjected to gray-scale conversion using the a changed gray-scale conversion curve 1204. Also, the display 1016 displays the image region (pixels) 1202 corresponding to the density of the turning point (ex. 1.0) in terms of a predetermined pixel value (S1107). By displaying the reference gray-scale conversion curve and the changed gray-scale conversion curve, the operator can easily recognize the relationship between the amount of change made in the gray-scale conversion curve and the parameters. By simultaneously displaying the gray-scale-converted image and the changed gray-scale conversion curve, the operator can directly, visually, or intuitively recognize the relationship between the degree of change made in the image and the gray-scale curve. It is thus possible to easily, appropriately, or quickly set the parameters.

The operator looks at the gray-scale-converted image 1201, the image region 1202 corresponding to the density of the turning point, and the changed gray-scale conversion curve 1204, all of which are displayed, and determines whether or not an observable image or a desired image is created. Subsequently, the operator provides predetermined input. When the determination is affirmative, the process is terminated. When the determination is negative, the processing from step S1103 onward can be repeated (S1108). The image data which has been completely processed is transferred to a predetermined apparatus if necessary, and the image data is recorded, displayed, stored, or re-transferred. Generally, the image data is recorded by a printer (not shown) onto a film.

In the above description, the slope of the gray-scale conversion curve corresponding to a level which is less than or equal to the density of the turning point is changed. Needless to say, the slope of the gray-scale conversion curve at a level which is greater than or equal to the density of the turning point can be changed by a similar method, or the slope of the gray-scale conversion curve at a density lower than a predetermined density of a turning point and at a density higher than a predetermined density of a turning point can be changed by a similar method.

According to the second embodiment, even when a reference gray-scale conversion curve which has many parameters and which is thus difficult to change by adjusting the parameters is used, the shape of the gray-scale conversion curve can be easily changed using an auxiliary curve which has fewer parameters than the reference gray-scale conversion curve and which has a simple curve shape. By changing the few parameters (such as the slope and a region of the curve with the slope) of the auxiliary curve, the shape of the gray-scale conversion curve can be easily changed without changing the parameters of the reference gray-scale conversion curve. Even when using a reference gray-scale conversion curve which has a fixed curve shape, the shape of the gray-scale conversion curve can be changed using an auxiliary curve or an auxiliary curve capable of changing the curve shape.

Since means for changing the parameters of the auxiliary curve is provided, the shape of the auxiliary curve can be changed, and the shape of the composite gray-scale conversion curve generated in accordance with the auxiliary curve can be changed.

By displaying the reference gray-scale conversion curve and the changed gray-scale conversion curve, the operator can easily recognize the contents (characteristic) of gray-scale conversion. By displaying the changed gray-scale conversion curve or by displaying the reference gray-scale conversion curve and the changed gray-scale conversion curve, the relationship between the parameter values and the gray-scale conversion curve can be directly, visually, or intuitively recognized. It is thus possible to easily change the curve shape.

By simultaneously displaying the gray-scale-converted image and the gray-scale conversion curve, the operator can easily recognize the relationship between the gray-scale conversion curve and the gray-scale-converted image. It is thus possible to easily change the gray-scale conversion curve, and a desired image which can be easily observed can be easily or quickly created. By displaying the relationship between the set parameter values and the contents of image processing (for example, the distribution of the density of the turning point in the processed image) on the image, image processing effects corresponding to the parameter values (for example, an image region in which the density or pixel-value range is to be changed) can be directly, visually, or intuitively recognized. It is thus possible to easily or quickly set the parameters.

By arranging the auxiliary curve to satisfy the differential continuity (the differential coefficient or slope of the auxiliary curve is continuous at any point on the auxiliary curve except for both ends), the composite gray-scale conversion curve satisfies the differential continuity since the reference gray-scale conversion curve satisfies, in general, the differential continuity. Accordingly, artifacts such as a pseudo-contour are prevented from being generated when gray-scale conversion is performed. In other words, it is preferable that the auxiliary curve and the reference gray-scale conversion curve be continuous and differentiable curves (excluding both ends).

Third Embodiment

A third embodiment of the present invention will now be described.

Figure 18:
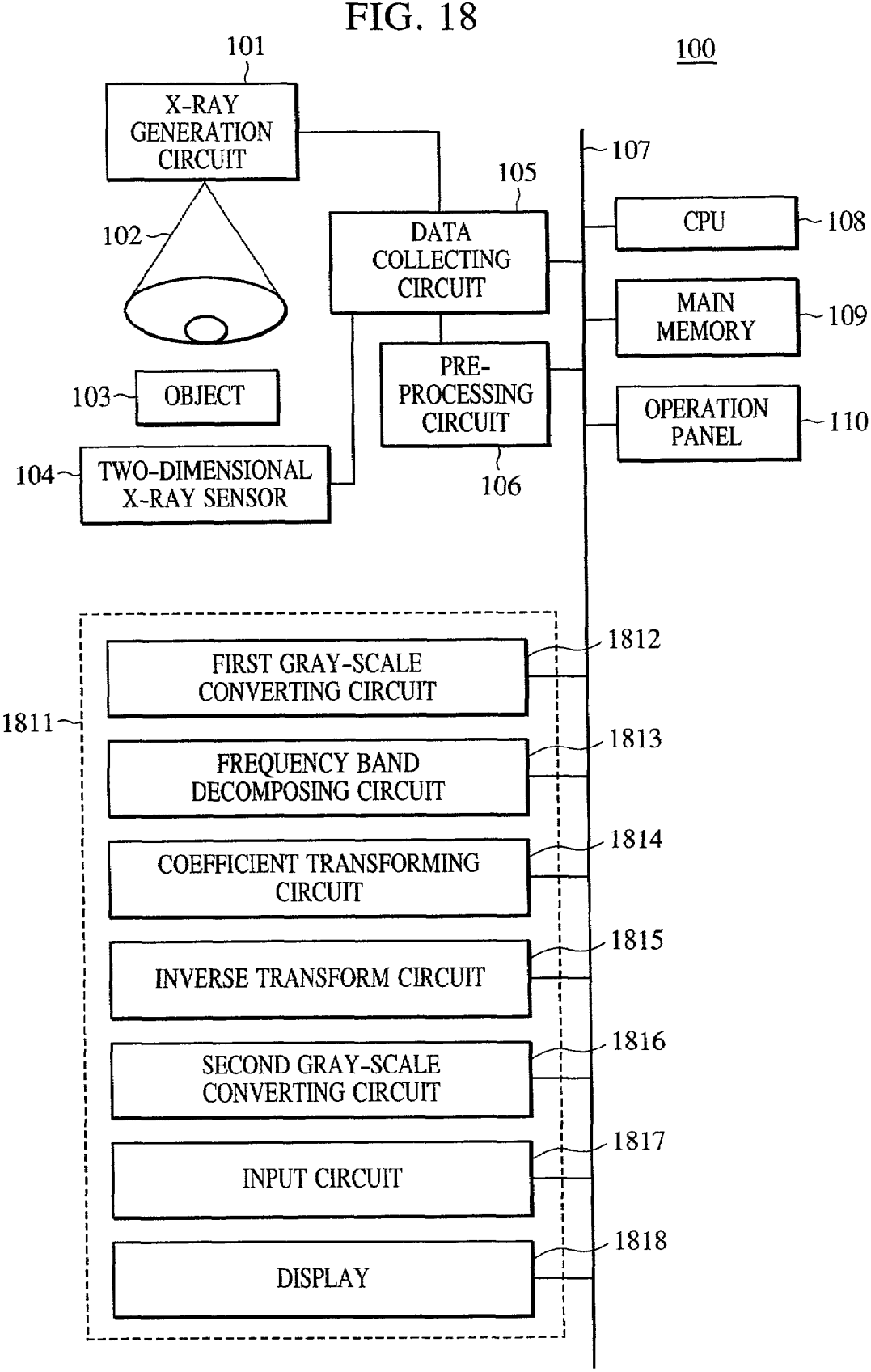
FIG. 18 is a block diagram showing the configuration of a radiographic apparatus according to a third embodiment of the present invention.

FIG. 18 shows the configuration of the radiographic apparatus 100 to which an image processing circuit of the third embodiment is applied. Descriptions of components and processes similar to those in the first embodiment are omitted.

Referring to FIG. 18, the configuration of an image processing circuit 1811 will now be described. The image processing circuit 1811 contains the following circuits. A first gray-scale converting circuit 1812 creates a first gray-scale conversion curve for converting the gray-scale of an original image and converts the gray-scale of the original image using the first gray-scale conversion curve. A frequency band decomposing circuit 1813 decomposes the image, which has been subjected to gray-scale conversion using the first gray-scale conversion curve created by the first gray-scale converting circuit 1812, into a plurality of frequency bands using, for example, the wavelet transform or the Laplacian pyramid transform, and obtains frequency coefficients of each frequency band. A coefficient transforming circuit 1814 changes frequency coefficients on the basis of the slope of the first gray-scale conversion curve used by the first gray-scale converting circuit 1812. An inverse transform circuit 1815 inverts (performs inverse transform on) the coefficients changed by the coefficient transforming circuit 1814 and creates a reconstructed image. A second gray-scale converting circuit 1816 creates a second gray-scale conversion curve for converting the gray-scale of the reconstructed image generated by the inverse transform circuit 1815 and converts the gray-scale of the reconstructed image using the second gray-scale conversion curve. An input circuit 1817 inputs parameters for adjusting the shape of the first gray-scale conversion curve created by the first gray-scale converting circuit 1812 and the amount of change in the frequency coefficients to be implemented by the coefficient transforming circuit 1814. A display (display means) 1818 displays a composite (composite gray-scale conversion curve) of the first gray-scale conversion curve created by the first gray-scale converting circuit 1812 and the second gray-scale conversion curve created by the second gray-scale converting circuit 1816 and a processed image.

Figure 19:
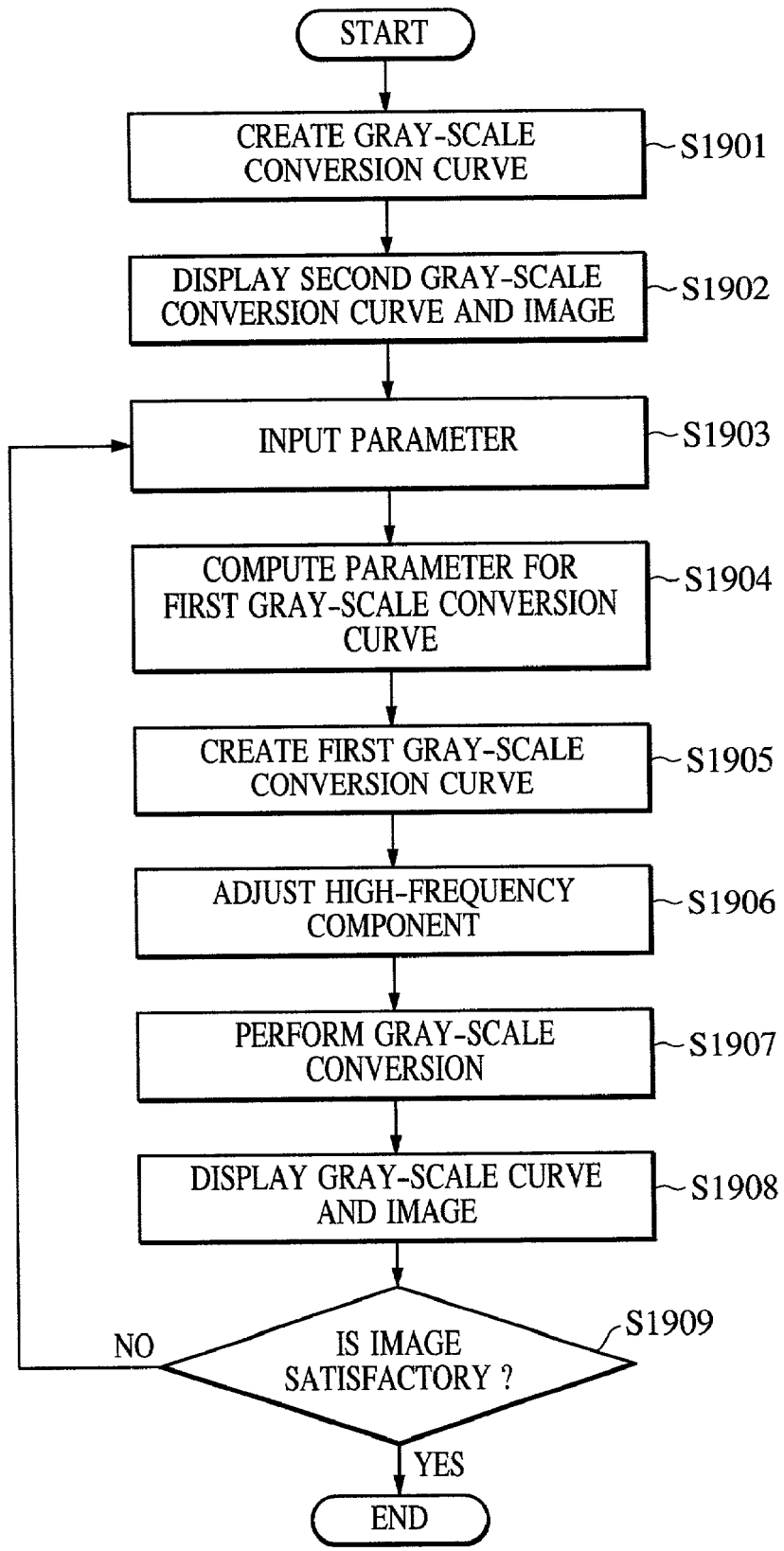
FIG. 19 is a flowchart showing a process performed in the third embodiment.
Figure 20:
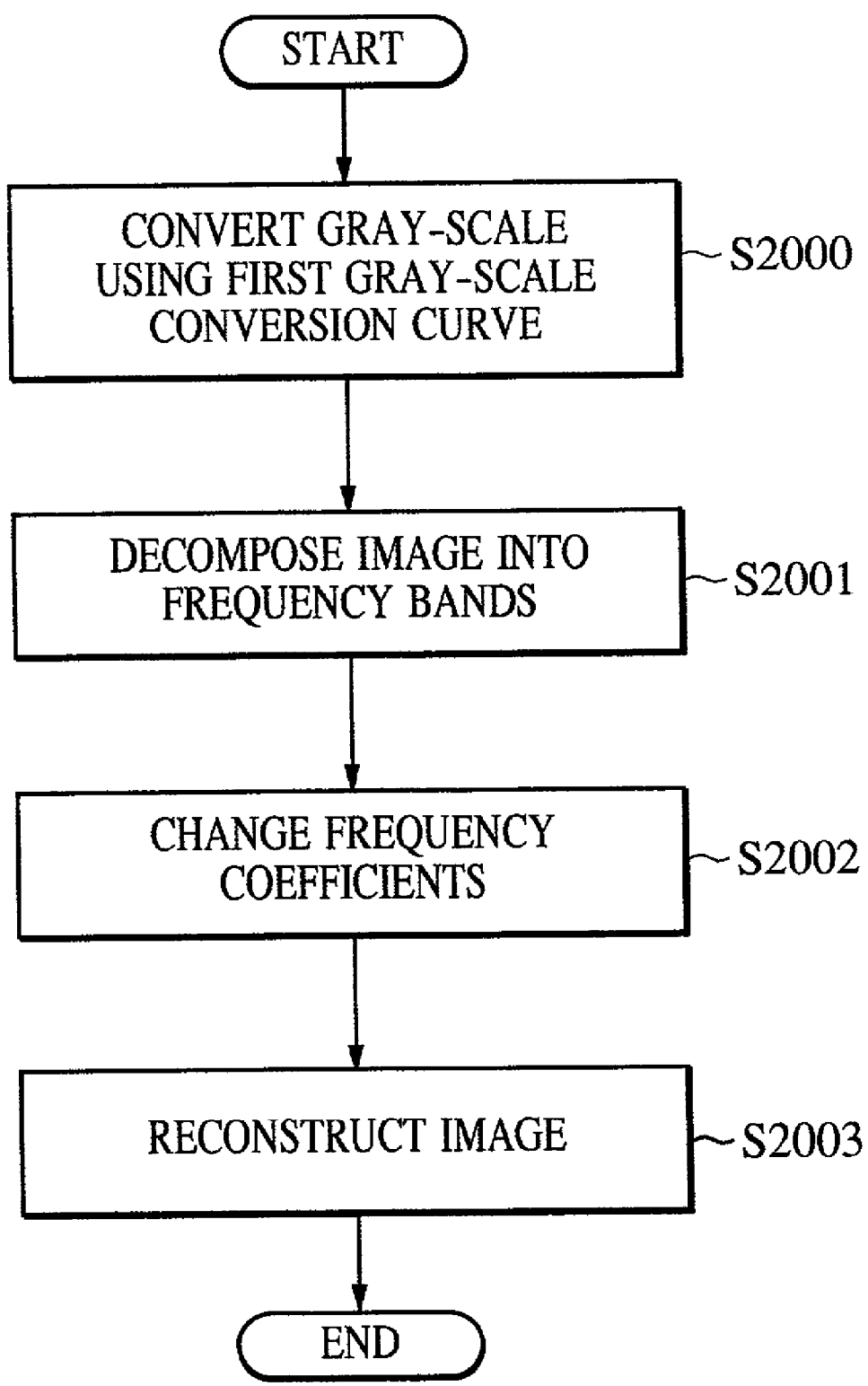
FIG. 20 is a flowchart showing a process of adjusting a high-frequency component in the third embodiment.

FIGS. 19 and 20, discussed below, are flowcharts showing processes performed in the third embodiment.

Figure 21:
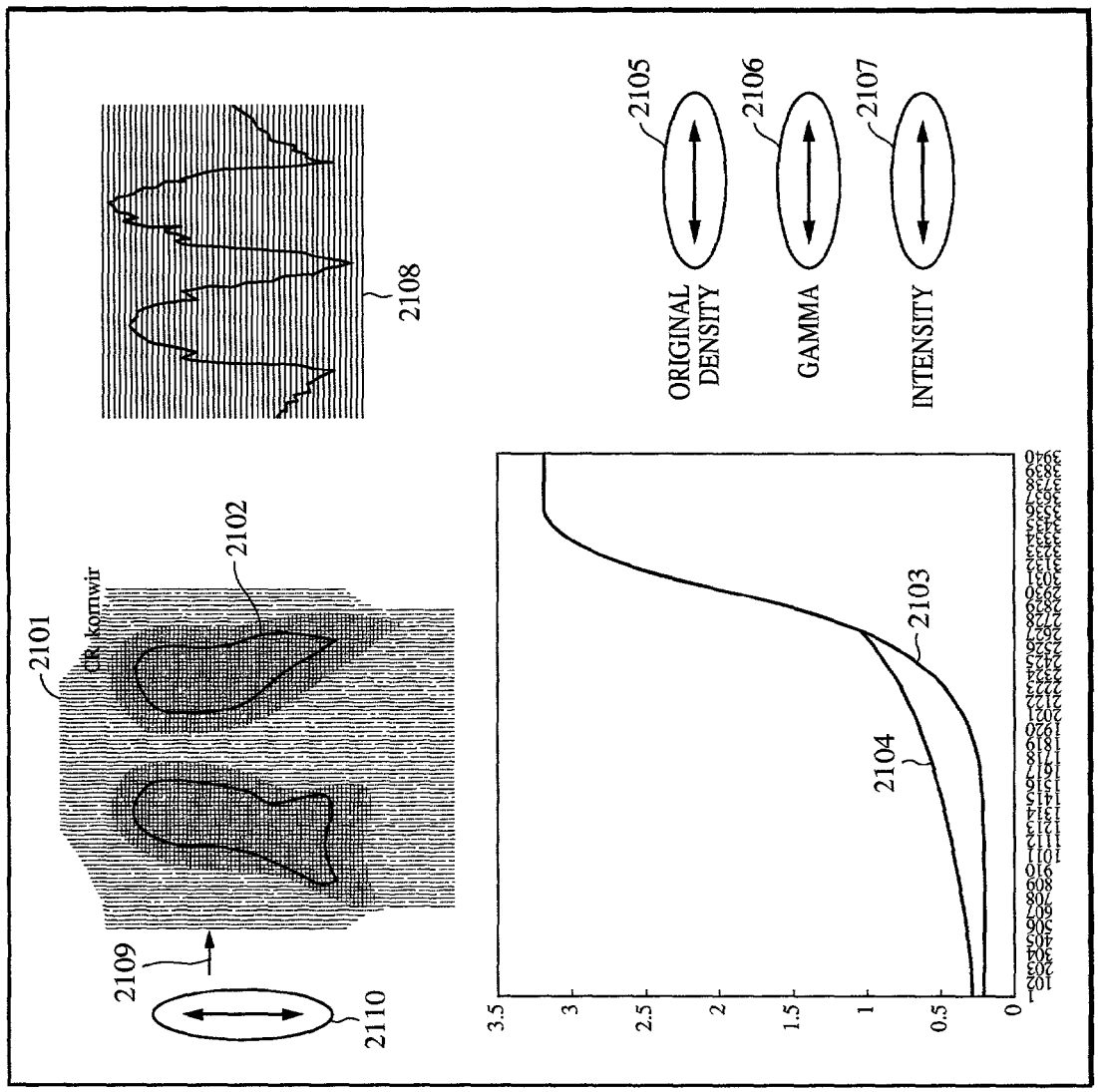
FIG. 21 illustrates images displayed on the display of the radiographic apparatus of FIG. 18.

FIG. 21 shows an example of an image displayed on the display 1818. The display 1818 displays a processed image 2101 generated by processing an image to be processed; an image region (pixels) 2102 corresponding to a density level of a turning point of the first gray-scale conversion curve which is one parameter required by the first gray-scale converting circuit 1812 to create a first gray-scale conversion curve, which is displayed in terms of a predetermined pixel value (such as predetermined luminance); a second gray-scale conversion curve 2103 created by the second gray-scale converting circuit 1816; and a composite curve 2104 of the second gray-scale conversion curve 2103 and the first gray-scale conversion curve created by the first gray-scale converting circuit 1812. For example, in this graph, the horizontal axis represents the pixel value of an original image, and the vertical axis represents the density of the gray-scale-converted image.

Graphical portions 2105, 2106, and 2107 display parameters for inputting parameters required by the first gray-scale converting circuit 1812 to create the first gray-scale conversion curve and a parameter required by the coefficient transforming circuit 1814 to adjust the amount of the frequency coefficients. The portion 2105 shows a density of a turning point corresponding to a density on a film. The portion 2106 shows the slope of the first gray-scale conversion curve. The portion 2107 shows the intensity for changing the frequency coefficients. A portion 2108 displays a horizontal profile of the image 2101 and is used to confirm detailed effects of image processing. An arrow 2109 indicates the position of the horizontal profile 2108 in the image 2101. The position can be adjusted from a graphical portion 2110.

Figure 22:
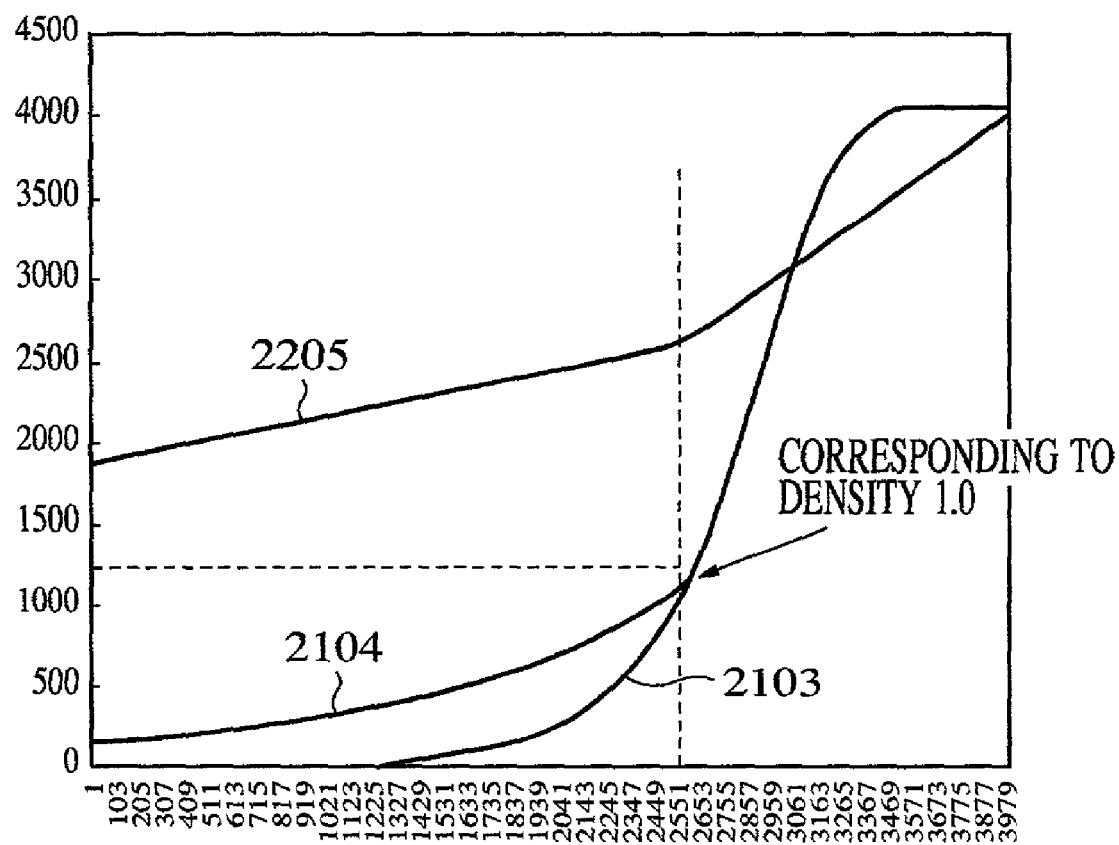
FIG. 22 is a graph showing a first gray-scale conversion curve, a second gray-scale conversion curve, and a composite gray-scale conversion curve.
Figure 23A:
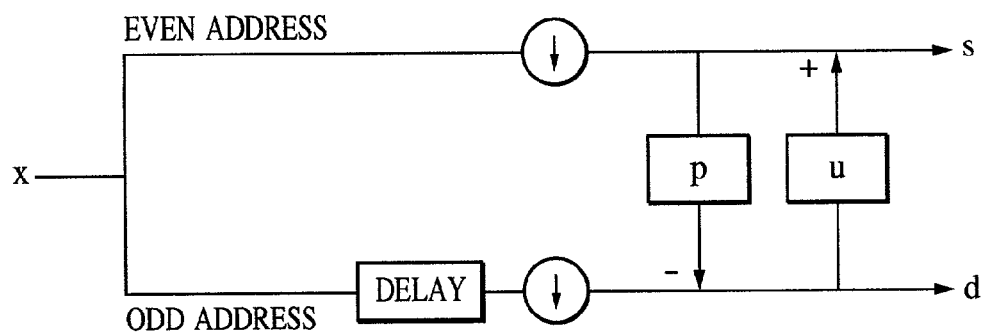
FIGS. 23A to 23C illustrate the configuration of a circuit for performing multi-frequency processing using wavelet transform.
Figure 23B:
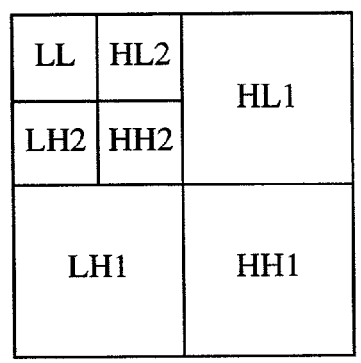
Figure 23C:
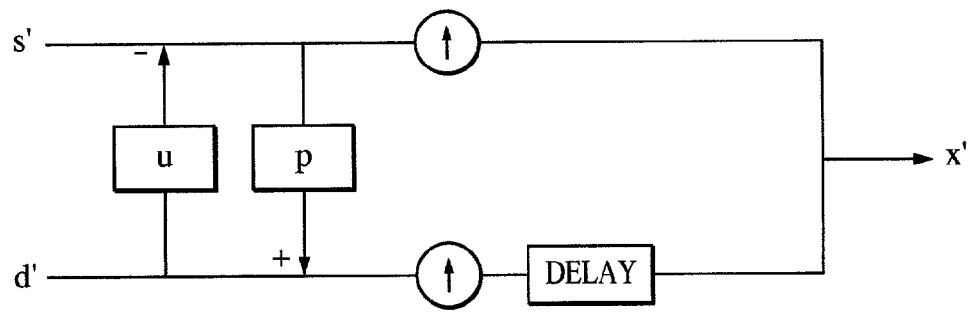

FIG. 22 shows a first gray-scale conversion curve 2205 created by the first gray-scale converting circuit 1812. The first gray-scale conversion curve 2205 is created, for a region in which the pixel value is less than or equal to a pixel value corresponding to the density of the turning point (for example, 1.0) input in the portion 2105, by setting a slope in accordance with slope information input in the portion 2106. FIG. 23A shows an example of the configuration of the frequency band decomposing circuit 1813 which uses the discrete wavelet transform (hereinafter referred to as the DWT transform). FIG. 23B shows an example of a group of two-level frequency coefficients obtained by the two-dimensional DWT transform. FIG. 23C shows an example of the configuration of the inverse transform circuit 1815 which uses the inverse DWT transform.

Figure 24:
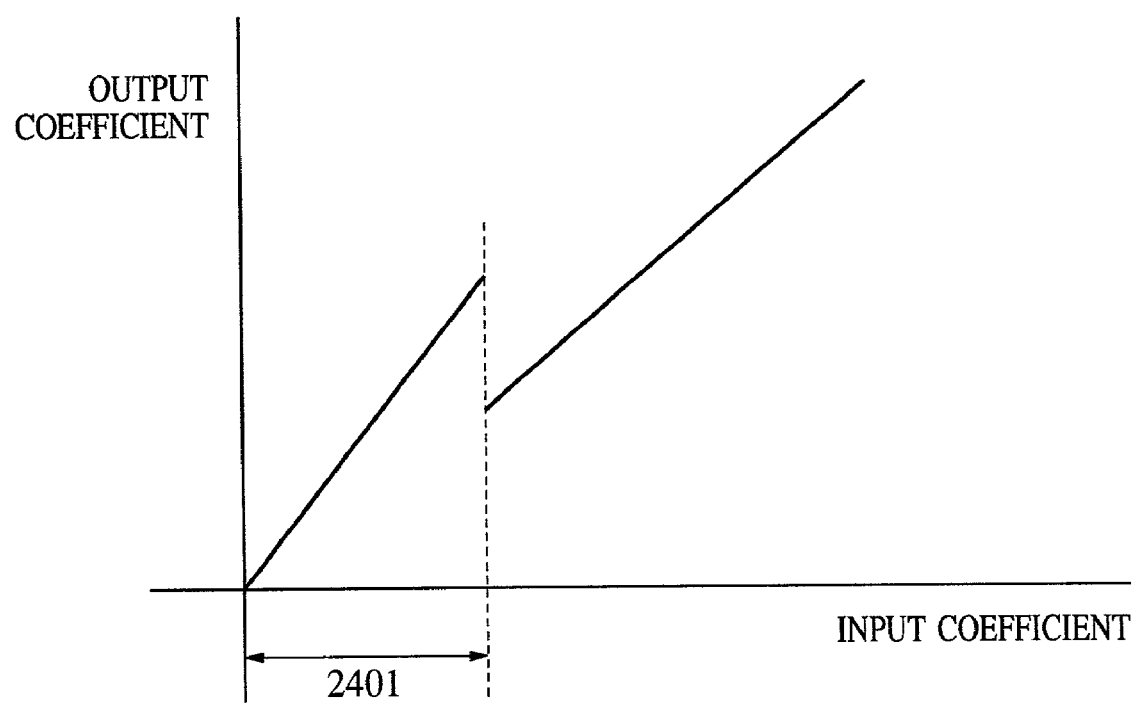
FIG. 24 is a graph showing a curve for converting a frequency coefficient.

FIG. 24 shows a curve for changing the coefficients used by the coefficient transforming circuit 1814. The horizontal axis represents an input coefficient, and the vertical axis represents an output coefficient. The curve is intended to change only coefficients within a region 2401.

Figure 25:
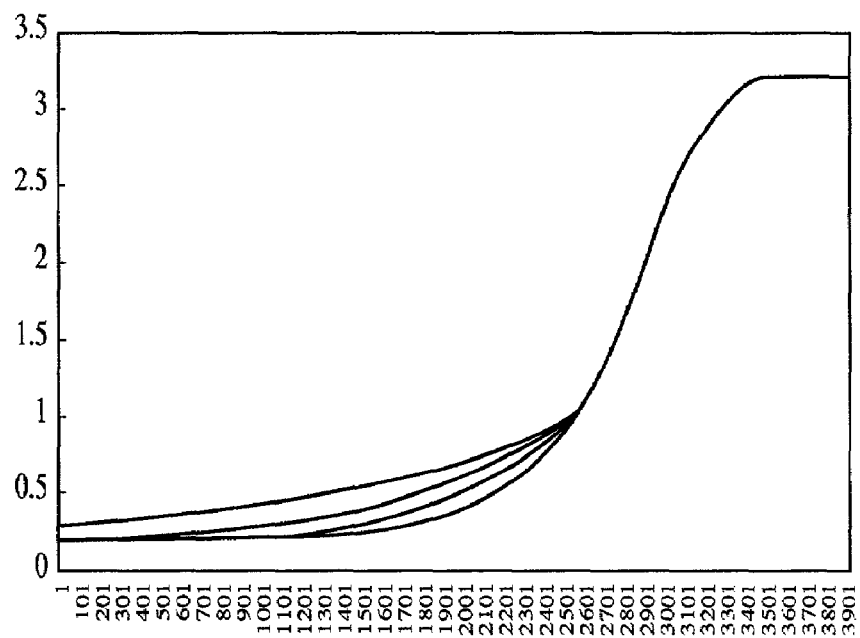
FIG. 25 is a graph showing a composite gray-scale conversion curve combining a first gray-scale conversion curve and a second gray-scale conversion curve.
Figure 26:
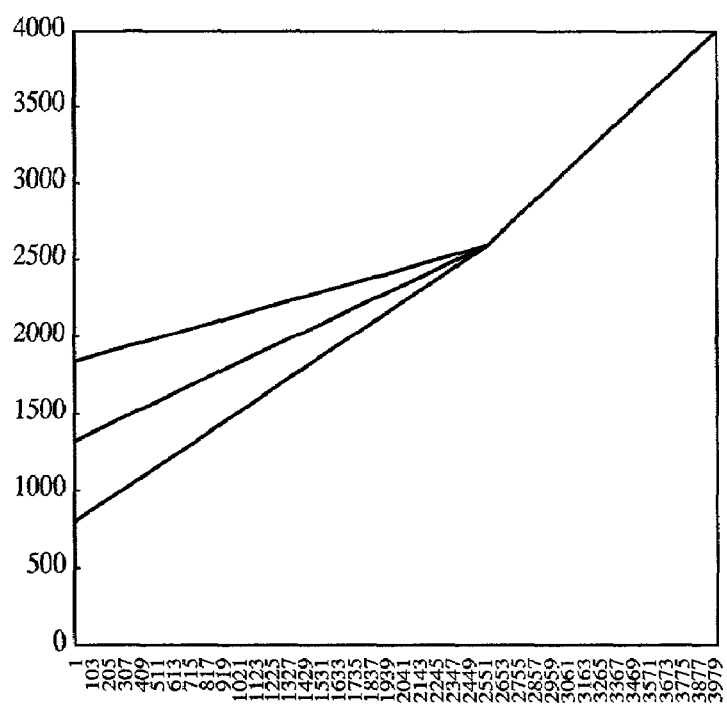
FIG. 26 is a graph showing a plurality of first gray-scale conversion curves for changing the dynamic range.
Figure 27:
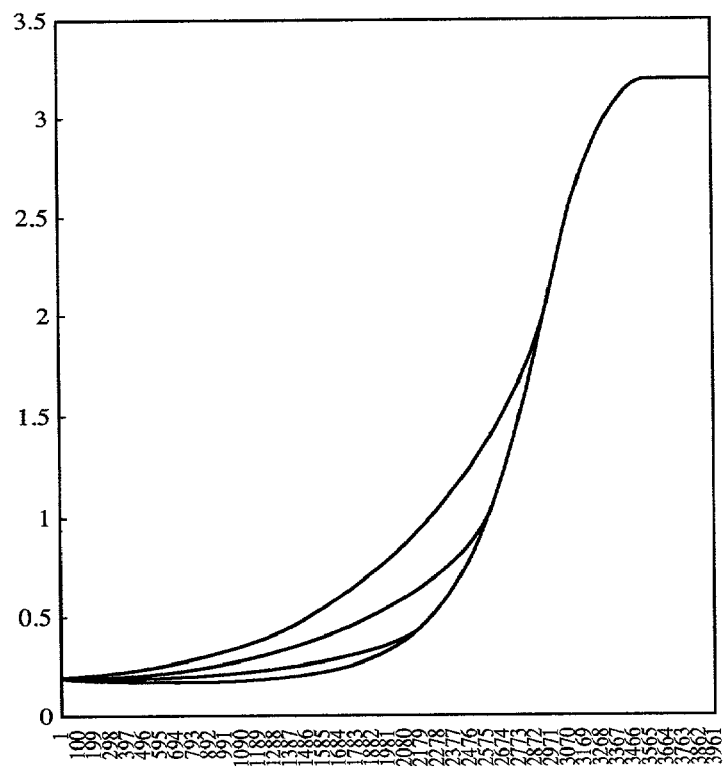
FIG. 27 is a graph showing a composite gray-scale conversion curve combining a first gray-scale conversion curve and a second gray-scale conversion curve.
Figure 28:
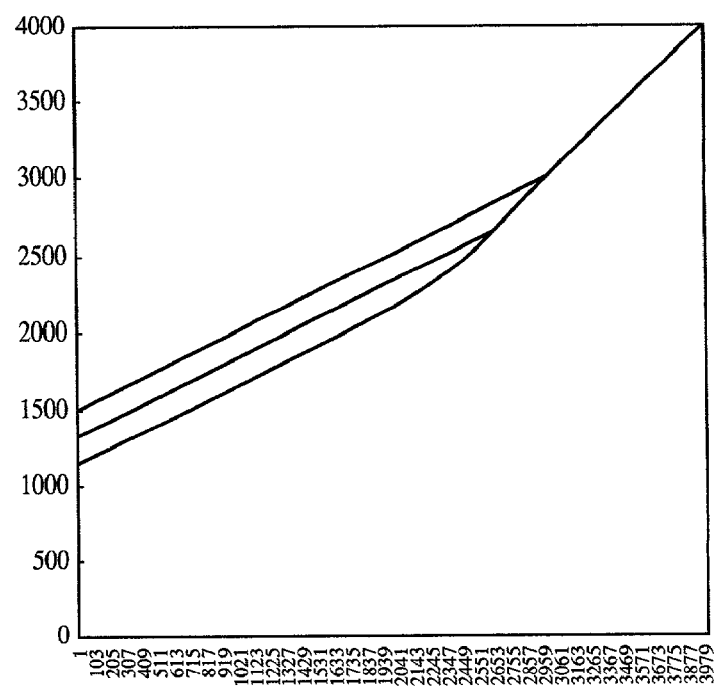
FIG. 28 is a graph showing a plurality of first gray-scale conversion curves for changing the dynamic range.

FIG. 26 shows examples of first gray-scale conversion curves created by the first gray-scale converting circuit 1812. FIG. 25 shows a composite of these first gray-scale conversion curves and a second gray-scale conversion curve created by the second gray-scale converting circuit 1816. FIG. 28 shows other examples of first gray-scale conversion curves created by the first gray-scale converting circuit 1812. FIG. 27 shows a composite of these first gray-scale conversion curves and a second gray-scale conversion curve.

The operation of the image processing circuit 1811 will now be described with reference to FIGS. 19 and 20.

The second gray-scale converting circuit 1816 which has received, through the CPU bus 107, an original image f(x, y) processed by the pre-processing circuit 106, creates a second gray-scale conversion curve (hereinafter may be referred to as a reference gray-scale conversion curve) F( ) and converts the gray-scale of the original image in accordance with equation (301) (S1901):

$$P(x, y)=F(f(x, y)) \tag{301}$$

where f(x, y) represents a pixel value of the original image, x and y represent coordinates on the original image, and P(x, y) represents a pixel value of the gray-scale-converted image. In this example, the reference gray-scale conversion curve F( ) is, for example, the gray-scale conversion curve 2103 shown in FIG. 21.

The display 1818 displays the gray-scale-converted image P(x, y), which in this case is, for example, the image 2101. Also, the display 1818 displays the gray-scale conversion curve 2103 and the portions 2105, 2106, 2107, and 2110 which are used to input the parameters (S1902).

An operator looks at the images 2101 and 2108 and inputs parameters for adjusting a region in which the gray-scale (density, luminance, or pixel value) is to be changed, the slope (gamma) of the first gray-scale conversion curve and the intensity for adding (emphasizing) a high-frequency component, under the control of the input circuit 1817, from the portions 2105, 2106, and 2107. Using the portion 2110, the operator inputs the position of the horizontal profile, which is to be displayed, in the image 2101. The portions 2105, 2106, 2107, and 2110 function as a graphical user interface. By clicking the portions 2105, 2106, 2107, and 2110, a desired instruction can be input. For example, when the operator clicks the rightward arrow → in the portion 2105, the density of the turning point is changed toward the "+" side. The changed parameter is displayed as a value at, for example, the right side of the rightward arrow. When the operator clicks the leftward arrow ← in the portion 2106, the gamma is changed to the "−" side. The changed parameter is displayed at, for example, the right side of the rightward arrow. When the display 1818 contains a touch panel, the parameters can be changed by directly touching the arrows in the portions 2105, 2106, and the like. These operations are under the control of the input circuit 1817. The changed parameters are fetched in the input circuit 1817 (S1903).

From the parameters fetched in the input circuit 1817, a parameter for creating a first gray-scale conversion curve is computed. For example, when the density of the turning point Y=1.0 is supplied to the input circuit 1817, a corresponding pixel value is computed using the reference gray-scale conversion curve 2103 in accordance with equation (302) (S1904):

$$X=F^{-1}(Y) \tag{302}$$

The pixel value corresponding to the density of the turning point (ex. 1.0), which is computed by equation (302), is X1.

The first gray-scale converting circuit 1812 creates a first gray-scale conversion curve in accordance with equation (303) using the parameter computed by the input circuit 1817 (S1905):

$$Y=G(X) \qquad (303)$$

where X represents an input pixel value, and Y represents an output pixel value. The specific shape of the first gray-scale conversion curve G( ) is expressed by equations (304) and (305):

In a pixel-value region in which the pixel value X>X1, $$Y=X \qquad (304)$$

In a pixel-value region in which the pixel value X≦X1, $$Y=A(p1) \times X+B(X1) \qquad (305)$$

where A( ) is a value determined from the parameter p1, which is fetched by the input circuit 1817 from the portion 2106 and which is for changing the slope of the first gray-scale conversion curve, using a linear equation expressed by equation (306), the slope of the first gray-scale conversion curve is changed by A(p1), and C is a constant:

$$A(p1)=C \times p1 \qquad (306)$$

B( ) is computed on the basis of X1 computed by the input circuit 1817 as expressed by:

$$B(X1)=(1-A(p1)) \times X1 \qquad (307)$$

In a case when changing the dynamic range (density or pixel value range) of a density region at a level less than or equal to the density of the turning point 1.0, and when A(p1)=0.5, the first gray-scale conversion curve 2205 shown in FIG. 22 is generated. The slope of the first gray-scale conversion curve in which the pixel value is less than or equal to X1 corresponding to the density of the turning point is A(p1). The first gray-scale conversion curve is defined by two lines having different slopes. One line passes through the turning point and the slope thereof is 1, and the other line is defined by two parameters (density of the turning point and slope (gamma)). By adjusting the two parameters, the shape of the first gray-scale conversion curve can be easily changed.

In this case, the first gray-scale conversion curve is created by two lines in order to simplify the description. However, it is preferable that differential values of the first gray-scale conversion curve be continuous (that the slope of the first gray-scale conversion curve change smoothly) by arranging the curve shape as described in Japanese Patent Laid-Open No. 2000-276590 applied for by the applicant of the present invention, that is, by arranging the curve shape by inscribing a circle in two lines. When the differential values of the first gray-scale conversion curve are discontinuous, artifacts such as a pseudo-contour are easily generated due to the discontinuous points. In other words, it is preferable that the first gray-scale conversion curve (excluding both ends thereof) be a continuous and differentiable curve.

Using the first gray-scale converting circuit 1812, the frequency band decomposing circuit 1813, the coefficient transforming circuit 1814, and the inverse transform circuit 1815, the dynamic range of the original image f(x, y) is changed, and high-frequency components are adjusted (S1906). The adjustment process will be described in detail with reference to FIG. 20. Specifically, gray-scale conversion is performed using the first gray-scale conversion curve G( ) created by the first gray-scale converting circuit 1812 in accordance with equation (308):

$$f1(x, y)=G(f(x, y)) \qquad (308)$$

where f1(x, y) represents the gray-scale-converted image generated by performing gray-scale conversion using the first gray-scale conversion curve.

The frequency band decomposing circuit 1813 decomposes the image into a plurality of frequency bands and computes coefficients of each frequency band (S2001). For example, the image f1(x, y) is subjected to the two-dimensional DWT (discrete wavelet transform) transform, thus outputting frequency coefficients. The frequency band decomposing circuit 1813 of the third embodiment separates an input image signal into an even address signal and an odd address signal using a combination of a delay element and a downsampler. The even address signal and the odd address signal are filtered by two filters p and u. Referring to FIG. 23A, a low-pass coefficient s and a high-pass coefficient d are each generated by decomposing a one-dimensional image signal at level 1. The low-pass coefficient s and the high-pass coefficient d are computed by the following equations:

$$d(n)=x(2*n+1)-\text{floor}((x(2*n)+x(2*n+2))/2) \qquad (309)$$

$$s(n)=x(2*n)+\text{floor}((d(n-1)+d(n))/4) \qquad (310)$$

where x(n) is an image signal to be converted.

Accordingly, the one-dimensional DWT transform of the image signal is performed. The two-dimensional DWT transform is implemented by successively performing the one-dimensional DWT transform of the image in the horizontal and vertical directions. Since the details of the two-dimensional DWT are known, a description thereof is omitted. FIG. 23B shows a group of two-level transform coefficients generated by the two-dimensional transform. The image signal is decomposed into frequency coefficients HH1, HL1, LH1, . . . , LL in different frequency bands. In FIG. 23B, each of HH1, HL1, LH1, . . . , LL (hereinafter referred to as sub-bands) is formed of frequency coefficients of a predetermined frequency band.

The coefficient transforming circuit 1814 transforms the frequency coefficients in accordance with a conversion curve F2 shown in FIG. 24 (S2002). In this case, only the coefficients within the region 2401 in which each of the coefficients is less than or equal to a predetermined absolute value are converted, and the coefficients exceeding the predetermined absolute value are conserved. In this example, hn(x, y) is an n-level frequency coefficient and is in the region 2401 in which the coefficient has an absolute value less than or equal to the predetermined absolute value, and h2n(x, y) is a value generated by converting the coefficient hn(x, y) in accordance with equation (311):

$$h2n(x, y)=p2X(1/G'(f(x, y))) \times hn(x, y) \qquad (311)$$

where p2 represents an intensity parameter for enhancing a high-frequency component input in the portion 2107, which is parameter changing means, displayed on the display 1818. Since the frequency coefficients exceeding the predetermined absolute value are conserved, the edge structure of a reconstructed image in which the difference exceeds a predetermined value is substantially conserved. As a result, artifacts referred to as overshooting are suppressed or prevented from being generated in edge portions.

Since the frequency coefficients (corresponding to effective components such as fine structures or the like in a human body) less than or equal to the predetermined absolute value are transformed on the basis of the gray-scale conversion curve G( ) using equation (311), even when the image is subjected to dynamic range changing processing using the gray-scale conversion curve G( ), a contrast of the fine structure as clear as that of the original image can be maintained. In equation (311), G'( ) is a differential coefficient at a pixel value f(x, y) of the gray-scale conversion curve G( ). Also, the intensity for changing the frequency coefficients can be adjusted by the factor p2 as the aforementioned parameter.

Referring again to FIG. 18, the inverse transform circuit 1815 performs the inverse discrete wavelet transform of the frequency coefficients transformed by the coefficient transforming circuit 1814 and generates a reconstructed image f2(x, y) (S2003). The input frequency coefficients are filtered by the two filters u and p, and the filtered frequency coefficients are up-sampled, thus outputting an image signal x'. This is performed by:

$$x'(2*n)=s'(n)-\text{floor}\,((d'(n-1)+d'(n))/4) \quad (312)$$

$$x'(2*n+1)=d'(n)+\text{floor}\,((x'(2*n)+x'(2*n+2))/2 \quad (313)$$

Accordingly, the one-dimensional inverse discrete wavelet transform of the transformed coefficients is performed. The two-dimensional inverse discrete wavelet transform is performed by successively performing the one-dimensional inverse transform in the horizontal and vertical directions. Since the details of the two-dimensional inverse discrete wavelet transform are known, a description thereof is omitted.

The second gray-scale converting circuit 1816 uses the second gray-scale conversion curve F( ) and performs gray-scale conversion in accordance with equation (314), thus generating a gray-scale-converted image f3(x, y) (S1907):

$$f3(x, y)=F(f2(x, y)) \quad (314)$$

The second gray-scale converting circuit 1816 creates a composite gray-scale conversion curve F3( ) expressed by equation (315):

$$Y=F3(X)=F(G(X)) \quad (315)$$

For example, the first gray-scale conversion curve 2205 and the second gray-scale conversion curve 2103 are combined in accordance with equation (315) to generate the composite gray-scale conversion curve 2104.

As FIG. 12 illustrates, the display 1818 displays the second gray-scale conversion curve (reference gray-scale conversion curve) 2103, the composite gray-scale conversion curve 2104, and the processed image f3(x, y). Also the display 1818 displays the image region (pixels) 2102 corresponding to the density of the turning point (such as 1.0) (S1908).

By displaying the reference gray-scale conversion curve and the composite gray-scale conversion curve, the range (partial density or pixel value range) to be changed of the dynamic range and the degree of change can be easily recognized. Thus, the range of the dynamic range to be changed and the degree of change can be adjusted appropriately. By simultaneously displaying the processed image and at least the latter of the reference gray-scale conversion curve and the composite gray-scale conversion curve, the relationship between the degree of change made in the image and the composite gray-scale conversion curve can be directly, visually, or intuitively recognized. Thus, the parameter for changing the dynamic range can be easily adjusted.

The operator looks at the gray-scale-converted image 2101, the image region 2102 corresponding to the density of the turning point, and the changed gray-scale conversion curve 2104, and determines whether or not an observable image or a desired image has been created. Subsequently, the operator provides predetermined input. When the determination is affirmative, the process is terminated. When the determination is negative, the process from step S1903 onward can be repeated (S1909). The image data which has been completely processed is transferred to a predetermined apparatus if necessary, and the image data is recorded, displayed, or re-transferred. Generally, the image data is recorded by a printer (not shown) on a film.

In the above description, the slope of the gray-scale conversion curve corresponding to a level less than or equal to the density of the turning point is changed. Needless to say, the slope of the gray-scale conversion curve at a level greater than or equal to the density of the turning point can be changed by a similar method, or the slope of the gray-scale conversion curve at a density lower than a predetermined density of a turning point and at a density higher than a predetermined density of a turning point can be changed by a similar method.

According to the third embodiment, by displaying the composite gray-scale conversion curve combining the first gray-scale conversion curve for changing the dynamic range and the second gray-scale conversion curve, effects achieved by the dynamic range change and the gray-scale conversion can be easily recognized. Thus, the parameter for changing the dynamic range can be easily adjusted, and the dynamic range can be appropriately changed.

Since means for changing the parameter of the first gray-scale conversion curve is provided, the shape of the first gray-scale conversion curve can be changed. Hence the region (partial density or pixel value region) in which the dynamic range (partial density or pixel value region) is to be changed and the degree of change can be adjusted. Since means for changing the parameter for adjusting the intensity for changing the frequency coefficients is provided, the amount of change to be made in the high-frequency components can be adjusted in accordance with an image.

By adjusting the intensity for adding (emphasizing) a high-frequency component depending on the slope of the first gray-scale conversion curve, an image of which the dynamic range has been changed can effectively conserve the amplitude of a (predetermined) high-frequency component as compared to that of the image prior to being subjected to the dynamic range changing processing.

By simultaneously displaying the processed image and at least the latter of the reference gray-scale conversion curve and the composite gray-scale conversion curve, the relationship between the composite gray-scale conversion curve and the processed image can be easily recognized. Thus, the first gray-scale conversion curve can be easily changed, and an observable or desired image can be easily or quickly created. By displaying, on the image, the relationship between the set parameter values and the contents of image processing (for example, the distribution of the density of the turning point in the processed image), effects of image processing in accordance with the parameter values can be directly, visually, or intuitively recognized. Accordingly, the parameters can be easily or quickly set.

By conserving the frequency coefficients exceeding the predetermined absolute value, the edge structure of a reconstructed image in which the difference exceeds a predetermined value is conserved. As a result, artifacts referred to as overshooting are prevented from being generated in edge portions.

As described above, according to the embodiments, there are provided an image processing apparatus, an image processing method, a storage medium, and a program for easily setting parameters for changing the dynamic range or partial pixel-value range of an image while taking into consideration characteristics of gray-scale conversion, which differs from the dynamic range or partial pixel-value range changing processing, or the gray-scale-converted image. Alternatively, there are provided an image processing apparatus, an image processing method, a storage medium, and a program for easily changing the shape of a gray-scale conversion curve which is a predetermined gray-scale conversion curve or is described by many parameters. Alternatively, there are provided an image processing apparatus, an image processing method, a storage medium, and a program for recognizing a composite gray-scale conversion curve combining a gray-scale conversion curve used in gray-scale conversion and another gray-scale conversion curve used in image processing differing from the gray-scale conversion and for performing image processing.

Other Embodiments

Note that the present invention may be applied to either a system constituted by a plurality of apparatuses (e.g., image processing apparatuses, interfaces, radiographic apparatuses, X-ray generation apparatuses, and the like) or an arrangement that integrates an image processing apparatus and a radiographic apparatus, or the like.

Further, the object of the present invention can also be achieved by providing a storage medium storing program codes for performing the aforesaid processes to a computer system or apparatus (e.g., a personal computer), reading the program codes, by a CPU, MPU or the like of the computer system or apparatus, from the storage medium, then executing the program.

In this case, the program codes read from the storage medium realize the functions according to the embodiments, and the storage medium storing the program codes constitutes the invention.

Further, as the storage medium, a floppy disk, a hard disk, an optical disk, a magneto-optical disk, a CD-ROM, a CD-R, a magnetic tape, a non-volatile type memory card, a ROM and the like can be used for providing the program codes.

Furthermore, besides the aforesaid functions according to the above embodiments are realized by executing the program codes which are read by a computer, the present invention includes a case where an OS (operating system) or the like working on the computer performs a part or the entire process in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or the entire process in accordance with designations of the program codes and realizes functions of the above embodiments.

In a case where the present invention is applied to the aforesaid storage medium, the storage medium stores program codes corresponding to the flowchart shown in FIG. 2, 11, or 19 described in the embodiments.

The present invention is not limited to the above embodiments and various changes and modifications can be made within the spirit and scope of the present invention. Therefore to apprise the public of the scope of the present invention, the following claims are made.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:
   image processing means for performing a process on an image, the process changing a size of a high frequency component and using (i) a first gray-scale conversion process based on a first gray-scale conversion curve and (ii) a slope of the first gray-scale conversion curve;
   gray-scale conversion means for performing a second gray-scale conversion process on the high-frequency component size-changed image using a second gray-scale conversion curve; and
   first curve display means for displaying a composite gray-scale conversion curve combining the first and second gray-scale conversion curves.

2. An image processing apparatus according to claim 1, wherein said image processing means comprises:
   smoothing means for smoothing the image converted by the first gray-scale conversion process;
   calculating means for calculating the high frequency component by subtracting the image smoothed by the smoothing means from the image converted by the first gray-scale conversion process;
   changing means for changing the high frequency component based on the slope of the first gray-scale conversion curve; and
   adding means for adding the changed high frequency component to the image converted by the first gray-scale conversion process.

3. An image processing apparatus according to claim 2, wherein said image processing means comprises:
   smoothing means for smoothing the image converted by the first gray-scale conversion process;
   frequency transform means for decomposing the image converted by the first gray-scale conversion process into components of a plurality of frequency ranges;
   frequency component transform means for changing a component of a high frequency range from among the components of the plurality of frequency ranges based on the slope of the first gray-scale conversion curve; and
   inverse frequency transform means for generating an image based on the components of the plurality of frequency ranges after being changed by the frequency component transform means.

4. An image processing apparatus according to claim 3, wherein said frequency transform means performs a discrete wavelet transform.

5. An image processing apparatus according to claim 1, further comprising:
    image display means for displaying image data for the image processed by said image processing means and said gray-scale conversion means; and
    parameter input means for changing an image processing parameter for said image processing means,
    wherein the first gray-scale conversion curve comprises a curve having the shape of a multi-segment line being continuous and differentiable except for both ends thereof.

6. An image processing apparatus according to claim 1, further comprising:
    second curve display means for displaying the composite gray-scale conversion curve and the second gray-scale conversion curve,
    wherein the first gray-scale conversion curve used by said image processing means comprises a curve having the shape of a multi-segment line,
    and wherein a slope and/or turning point of a predetermined line segment forming the first gray-scale conversion curve is variable.

7. An image processing apparatus according to claim 1, further comprising:
    second curve display means for displaying the composite gray-scale conversion curve and the second gray-scale conversion curve;
    image display means for displaying image data for the image processed by said image processing means and said gray-scale conversion means; and
    parameter input means for changing an image processing parameter for said image processing means,
    wherein the image processing parameter comprises a parameter for changing the first gray-scale conversion curve.

8. An image processing apparatus according to claim 1, further comprising:
    second curve display means for displaying the composite gray-scale conversion curve and the second gray-scale conversion curve;
    image display means for displaying image data for the image processed by said image processing means and said gray-scale conversion means; and
    parameter input means for changing an image processing parameter for said image processing means,
    wherein the image processing parameter comprises a parameter for changing the first gray-scale conversion curve,
    and wherein the first gray-scale conversion curve comprises a curve having the shape of a multi-segment line being continuous and differentiable except for both ends thereof.

9. An image processing apparatus according to claim 1,
    wherein image region concerning a dynamic range or a partial pixel value range of the image changed by the first gray-scale conversion processing is displayed along with a processed image processed by said image processing means and said gray-scale conversion means on the processed image, and
    wherein the first gray-scale conversion curve comprises a curve having the shape of a multi-segment line being continuous and differentiable except for both ends thereof.

10. An image processing apparatus according to claim 1,
    wherein image region concerning a dynamic range or a partial pixel value range of the image changed by the first gray-scale conversion processing is displayed along with a processed image processed by said image processing means and said gray-scale conversion means on the processed image, and
    wherein an image processing parameter for said image processing means comprises a parameter for changing the first gray-scale conversion curve.

11. An image processing apparatus according to claim 1, further comprising:
    image display means for displaying image data for the image processed by said image processing means and said gray-scale conversion means; and
    parameter input means for changing an image processing parameter for said image processing means,
    wherein the image processing parameter comprises a parameter for changing the first gray-scale conversion curve,
    wherein the first gray-scale conversion curve comprises a curve having the shape of a multi-segment line being continuous and differentiable except for both ends thereof,
    and wherein image region concerning a dynamic range or a partial pixel value range of the image changed by the first gray-scale conversion processing is displayed along with a processed image processed by said image processing means and said gray-scale conversion means on the processed image.

12. An image processing apparatus according to claim 1,
    wherein image region concerning a dynamic range or a partial pixel value range of the image changed by the first gray-scale conversion processing is displayed along with a processed image processed by said image processing means and said gray-scale conversion means on the processed image,
    wherein the image region information comprises a region of the processed image corresponding to a turning point of a predetermined line segment forming the first gray-scale conversion curve having the shape of a multi-segment line,
    and wherein the first gray-scale conversion curve having the shape of the multi-segment line is continuous and differentiable except for both ends thereof.

13. An image processing apparatus according to claim 1, further comprising:
    image display means for displaying image data for the image processed by said image processing means and said gray-scale conversion means; and
    parameter input means for changing an image processing parameter for said image processing means,
    wherein image region concerning a dynamic range or a partial pixel value range of the image changed by the first gray-scale conversion processing is displayed along with a processed image processed by said image processing means and said gray-scale conversion means on the processed image,
    wherein the image region information comprises a region of the processed image corresponding to a turning point of a predetermined line segment forming the first gray-scale conversion curve having the shape of a multi-segment line,
    and wherein the image processing parameter comprises a parameter for changing the first gray-scale conversion curve.

14. An image processing apparatus according to claim 1, further comprising:
    image display means for displaying image data for the image processed by said image processing means and said gray-scale conversion means; and parameter input means for changing an image processing parameter for said image processing means, wherein image region concerning a dynamic range or a partial pixel value range of an image changed by the first gray-scale conversion processing is displayed along with a processed image processed by said image processing means and said gray-scale conversion means on the processed image, wherein the image region information comprises a region of the processed image corresponding to a turning point of a predetermined line segment forming the first gray-scale conversion curve having the shape of a multi-segment line, wherein the image processing parameter comprises a parameter for changing the first gray-scale conversion curve, and wherein the first gray-scale conversion curve having the shape of the multi-segment line is continuous and differentiable except for both ends thereof.

15. An image processing apparatus comprising:

an image processing section that performs a process on an image, the process changing a size of a high frequency component an using (i) a first gray-scale conversion process based on a first gray-scale conversion curve and (ii) a slope of the first gray-scale conversion curve;

a gray-scale conversion section that performs a second gray-scale conversion process on the high-frequency component size-changed image using a second gray-scale conversion curve; and a display section that displays a composite gray-scale conversion curve combining the first and second gray-scale conversion curves.

16. An image processing apparatus according to claim 15, wherein said image processing section comprises:

a smoothing section for smoothing the image converted by the first gray-scale conversion process;

a calculating section for calculating the high frequency component by subtracting the images smoothed by the smoothing section from the image converted by the first gray-scale conversion process;

a changing section for changing the high frequency component based on the slope of the first gray-scale conversion curve; and an adding section for adding the changed high frequency component to the image converted by the first gray-scale conversion process.

17. An image processing apparatus according to claim 15, wherein said image processing section comprises:

a smoothing section for smoothing the image converted by the first gray-scale conversion process;

a frequency transform section that decomposes the image converted by the first gray-scale conversion process into components of a plurality of frequency ranges; and a frequency component transform section that changes a component of a high frequency range from among the components of the plurality of frequency ranges based on the slope of the first gray-scale conversion curve; and an inverse frequency component transform section that generates an image based on the components of the plurality of frequency ranges after being changed by the frequency component transform section.

18. An image processing method comprising:

an image processing step of performing a process on an image, the process changing a size of a high frequency component and using (i) a first gray-scale conversion process based on a first gray-scale conversion curve and (ii) a slope of the first gray-scale conversion curve;

a gray-scale conversion step of performing a second gray-scale conversion process on the high-frequency component size-changed image using a second gray-scale conversion curve; and a display step of displaying a composite gray-scale conversion curve combining the first and second gray-scale conversion curves.

19. A computer-readable storage medium storing a program for processing an image, the program comprising codes for executing:

an image processing step of performing a process on an image, the process changing a size of a high frequency component and using (i) a first gray-scale conversion process based on a first gray-scale conversion curve and (ii) a slope of the first gray-scale conversion curve;

a gray-scale conversion step of performing second gray-scale conversion process on the high-frequency component size-changed image using a second gray-scale conversion curve; and a display step of displaying a composite gray-scale conversion curve combining the first and second gray-scale conversion curves.

* * * * *

UNITED STATES PATENT AND TRADEMARK OFFICE
CERTIFICATE OF CORRECTION

PATENT NO. : 7,024,036 B2 Page 1 of 1
APPLICATION NO. : 10/106101
DATED : April 4, 2006
INVENTOR(S) : Hiroyuki Shinbata It is certified that error appears in the above-identified patent and that said Letters Patent is hereby corrected as shown below:

COLUMN 27:
Line 23, "an" should read -- and --.

Signed and Sealed this

Nineteenth Day of December, 2006

JON W. DUDAS
*Director of the United States Patent and Trademark Office*